(12) United States Patent
Hayashi et al.

(10) Patent No.: US 7,958,361 B2
(45) Date of Patent: Jun. 7, 2011

(54) INFORMATION PROCESSING APPARATUS AND METHOD

(75) Inventors: Junichi Hayashi, Kawasaki (JP); Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1191 days.

(21) Appl. No.: 11/458,175

(22) Filed: Jul. 18, 2006

(65) Prior Publication Data
US 2007/0022293 A1 Jan. 25, 2007

(30) Foreign Application Priority Data

Jul. 25, 2005 (JP) ................................. 2005-214529
Sep. 8, 2005 (JP) ................................. 2005-260884

(51) Int. Cl.
*H04L 9/32* (2006.01)
*H04N 7/167* (2011.01)
*G06F 17/00* (2006.01)

(52) U.S. Cl. ........ 713/176; 713/168; 380/200; 380/210; 715/255

(58) Field of Classification Search .................. 713/168, 713/175, 176, 179, 189; 709/230, 232, 238; 726/26; 380/200, 54, 210, 287; 382/100, 382/232, 309; 386/4, 52, 55; 715/255, 723, 715/732; 717/110
See application file for complete search history.

(56) References Cited

U.S. PATENT DOCUMENTS

| | | | | |
|---|---|---|---|---|
| 5,898,779 A * | 4/1999 | Squilla et al. | ................. | 713/176 |
| 5,907,619 A * | 5/1999 | Davis | ............................. | 713/176 |
| 5,995,626 A | 11/1999 | Nishioka et al. | | |
| 6,311,271 B1 * | 10/2001 | Gennaro et al. | .............. | 713/170 |
| 6,523,114 B1 * | 2/2003 | Barton | ......................... | 713/176 |
| 6,785,815 B1 * | 8/2004 | Serret-Avila et al. | ......... | 713/176 |
| 7,570,764 B2 * | 8/2009 | Morgan | ........................ | 380/247 |
| 2003/0105950 A1 * | 6/2003 | Hirano et al. | .................. | 713/100 |
| 2004/0181756 A1 * | 9/2004 | Berringer et al. | ............. | 715/530 |
| 2005/0091545 A1 * | 4/2005 | Soppera | ........................ | 713/202 |
| 2005/0235154 A1 * | 10/2005 | Serret-Avila | .................. | 713/176 |
| 2006/0136723 A1 * | 6/2006 | Taylor | ........................... | 713/168 |
| 2006/0136728 A1 * | 6/2006 | Gentry et al. | ................. | 713/176 |
| 2007/0217763 A1 * | 9/2007 | Siemens et al. | ............... | 386/112 |

FOREIGN PATENT DOCUMENTS

| | | |
|---|---|---|
| EP | 1267515 | 12/2002 |
| JP | 2003-132028 A | 5/2003 |
| WO | 99/40702 A1 | 8/1999 |
| WO | 00/75925 A1 | 12/2000 |

\* cited by examiner

*Primary Examiner* — Jung Kim
*Assistant Examiner* — Abdulhakim Nobahar
(74) *Attorney, Agent, or Firm* — Canon USA, Inc. IP Division

(57) ABSTRACT

An information processing method enables verification of validity of signed data using received partial signed data parts, even when all the signed data is not received. According to the information processing method, signature data including a signature value and digests of a plurality of partial signed data parts is received. Then, the signature data is verified by using the signature value and the digests of a plurality of partial signed data parts. Subsequently, the partial signed data is received according to a result of verifying the signature data. Then, the partial signed data is verified using the partial signed data and the digest of the partial signed data.

5 Claims, 30 Drawing Sheets

FIG.7A                FIG.7B
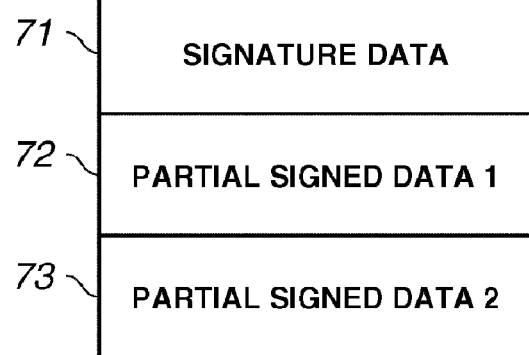
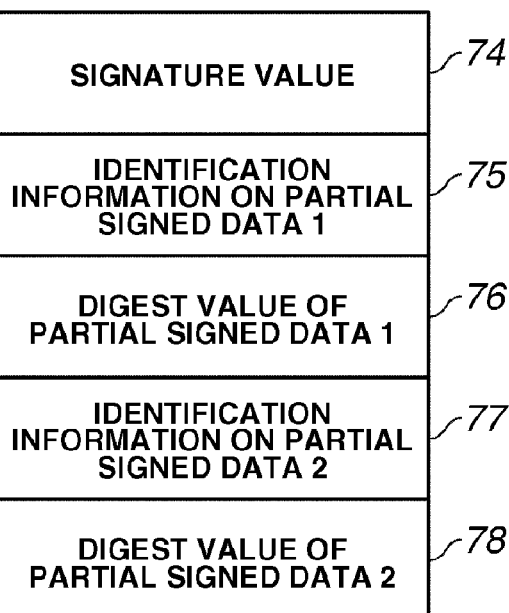

X.509 v3 FORMAT

FIG.23

| | | | | | | | | | | |
|---|---|---|---|---|---|---|---|---|---|---|
| SERVER | 231 | $VD_0$ $D_0$ | $VD_1$ $D_1$ | $VD_2$ $D_2$ | $VD_3$ $D_3$ | $VD_4$ $D_4$ | | | | |
| | | $VD_0=F(K, D_0)$ | $VD_1=F(K, D_1)$ | $VD_2=F(K, D_2)$ | $VD_3=F(K, D_3)$ | $VD_4=F(K, D_4)$ | | | | |
| CLIENT | 232 | $VD_0$ $D'_0$ | $VD_1$ $D'_1$ | $VD_2$ $D'_2$ | $VD_3$ $D'_3$ | $VD_4$ $D'_4$ | | | | |
| | | $VD'_0=F(K, D'_0)$ | $VD'_1=F(K, D'_1)$ | $VD'_2=F(K, D'_2)$ | $VD'_3=F(K, D'_3)$ | $VD'_4=F(K, D'_4)$ | | | | |
| | 233 | $VD_0$ $D'_0$ | $VD_1$ $D'_1$ | $VD_2$ $D^*_2$ | $VD_3$ $D'_3$ | $VD_4$ $D'_4$ | | | | |
| | | $VD'_0=F(K, D'_0)$ | $VD'_1=F(K, D'_1)$ | $VD'_2=F(K, D^*_2)$ | $VD'_3=F(K, D'_3)$ | $VD'_4=F(K, D'_4)$ | | | | |
| | 234 | $VD_0$ $D'_0$ | $VD_1$ $D'_1$ | $VD_2$ $D'_2$ | $VD_3$ $D'_3$ | $VD_4$ $D'_4$ | | | | |
| | | $VD'_0=F(K, D'_0)$ | | $VD'_2=F(K, D'_2)$ | $VD'_3=F(K, D'_3)$ | $VD'_4=F(K, D'_4)$ | | | | |
| | 235 | $VD_0$ $D'_0$ | $VD_1$ $D'_1$ | $VD_3$ $D'_3$ | $VD_2$ $D'_2$ | $VD_4$ $D'_4$ | | | | |
| | | $VD'_0=F(K, D'_0)$ | $VD'_1=F(K, D'_1)$ | $VD'_3=F(K, D'_3)$ | $VD'_2=F(K, D'_2)$ | $VD'_4=F(K, D'_4)$ | | | | |

FIG.30
IMAGE DISTRIBUTION SERVER
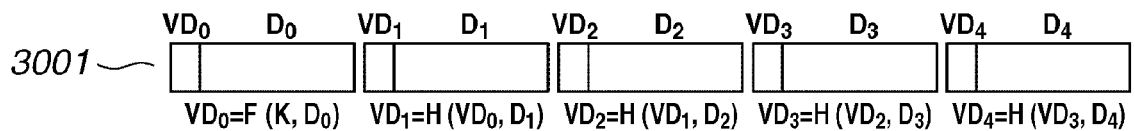
IMAGE REPRODUCTION CLIENT
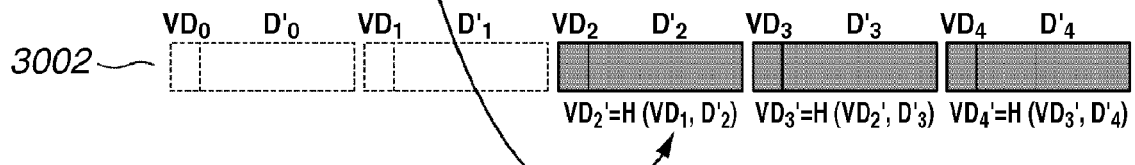

US 7,958,361 B2

INFORMATION PROCESSING APPARATUS AND METHOD

BACKGROUND OF THE INVENTION

1. Field of the Invention

The present invention relates to signature generation processing and signature verification processing.

2. Description of the Related Art

Recent rapid advancement and spread of computers and networks have resulted in digitization of various data, such as character data, image data, and audio data.

Digital data can be stored in perfect condition indefinitely without deterioration, such as aging. However, copying, editing, and processing can easily be performed thereon.

The copying, editing, and processing of the digital data are very useful to users, while protection of the digital data is a serious problem. Therefore, security technology rapidly increases in importance.

Accordingly, a technology called a digital signature has been proposed as a method of verifying additional falsification-proof data to enable a recipient to determine whether data transmitted to him is falsified. A digital signature technology has advantages in preventing not only data falsification but also Internet impersonation and repudiation.

Japanese Patent Application Laid-Open No. 2003-132028 has proposed a system configured to transmit digital data by preliminarily applying a digital signature technology thereto and to perform, when receiving the digital data to which a digital signature is added, verification processing on the digital signal applied thereto.

Although there are less serious problems in a case where a size of signed data to be received is small, the system described in Japanese Patent Application Laid-Open No. 2003-132028 cannot verify signed data in real time in synchronization with reception thereof especially in a case where the size of the signed data to be received is large. Also, it is necessary for verifying signed data to receive the entirety of the signed data. Thus, even when digital data or signed data is falsified, the entirety of the data should be received.

A system disclosed in U.S. Pat. No. 5,898,779 is configured to produce a digital signature that is not associated with the entire image but with a partial area of the image. This system can verify whether partial area data is falsified.

Although the system disclosed in U.S. Pat. No. 5,898,779 can verify whether partial area data is falsified, this system cannot verify association between image data and partial area data. Therefore, for example, even in a case where the partial area data is not included in the image data, or where the partial area data is a missing part of the image data, this system cannot verify validity of the image data.

SUMMARY OF THE INVENTION

An embodiment of the present invention is provided to overcome or at least mitigate the above-described problems and to enable verification of validity of signed data using received partial signed data even when the signed data is not received in its entirety.

According to a first aspect of the present invention, there is provided an information processing apparatus adapted to verify validity of signed data that includes a plurality of signed data parts. The information processing apparatus includes a signature data receiving unit, a signature data verification unit, a signed data receiving unit and a signed data part verification unit. The signature data receiving unit is adapted to receive signature data that includes a signature value and digests of a plurality of signed data parts. The signature data verification unit is adapted to verify the signature data using the signature value and the digests of a plurality of signed data parts. The signed data receiving unit is adapted to receive the signed data parts according to a result of verifying the signature data by the signature data verification unit. The signed data part verification unit is adapted to verify the signed data parts using the signed data parts and the digest of the signed data parts.

According to another aspect of the present invention, there is provided an information processing method for verifying validity of signed data that includes a plurality of signed data parts. The information processing method includes receiving signature data that includes a signature value and digests of a plurality of signed data parts, and verifying the signature data using the signature value and the digests of a plurality of signed data parts. The information processing method further includes receiving a first signed data part according to a result of verifying the signature data, and verifying the signed data part using the first signed data part and the digest of the first signed data part.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, serve to describe the principles of the invention.

FIGS. 7A and 7B respectively show structures of electronic data and signature data according to the first embodiment of the present invention.

FIG. 23 shows examples of a result of a related verification process.

FIG. 30 shows results of the verification data generation process and the verification process according to the third embodiment of the present invention.

DETAILED DESCRIPTION OF THE EMBODIMENTS

Exemplary embodiments of the invention will be described in detail below with reference to the drawings.

A Digital signature, a hash function, public key encryption, and a public key authentication infrastructure are briefly described below.

Digital Signature

Figure 10:
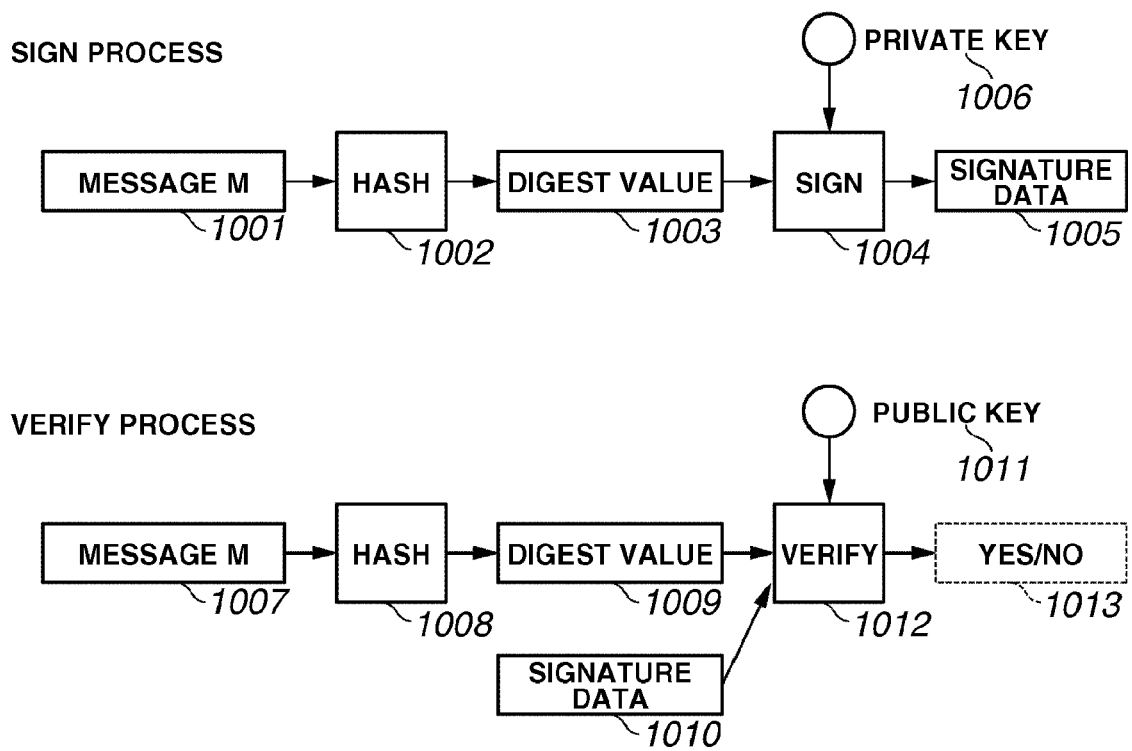
FIG. 10 is a block diagram showing a signature generation process and a signature verification process according to the first embodiment of the present invention.

A digital signature is described below. FIG. 10 is a schematic diagram illustrating a signature generation process and a signature verification process. The digital signature is described below with reference to FIG. 10. A hash function and public key encryption are used to generate digital signature data. A sender performs hash processing in step 1002 on input data M in step 1001 to calculate a digest value H(M), which is fixed length data, in step 1003. Subsequently, in step 1004, the sender performs conversion processing on the fixed length data H(M), which is obtained in step 1003, using a secret key $K_s$, which is set in step 1006, to generate digital signature data S in step 1005. Then, the sender transmits the digital signature data S and the input data M to a receiver.

In a verification step 1012, the receiver verifies whether data obtained by performing conversion (or decryption) processing on the digital signature data S, which is received in step 1010, using a public key $K_p$, which is set in step 1011, is matched with data obtained in step 1009 by performing, in step 1008, hash processing on the input data M, which is received in step 1007. If a result of verification shows no match in step 1013, the falsification of the data M is detected.

Public key encryption methods, such as RSA method and DSA method, which are described in detail later, are used for the digital signature. Security of the digital signature is based on computational difficulty in falsifying a signature or in decrypting a private key by an entity other than a holder of the private key.

Hash Function

Next, the hash function is described below. The hash function is utilized together with digital signature processing to irreversibly compress data to be signed, thereby reducing a signing processing time. That is, the hash function has functions of performing processing on data M having a given length, and of generating output data having a constant length. Hereunder, an output H(M) is referred to as hash data of plaintext data M.

Especially, a one-way hash function has a property that it is difficult in view of a calculation amount to calculate, when the data M is given, plaintext data M' that satisfies the following equation: H(M')=H(M). There are standard algorithms, such as MD2, MD5, and SHA-1, serving as the one-way hash functions.

Public Key Encryption

Next, the public key encryption is described below. The public key encryption utilizes two different keys and has a property that data encrypted by using one of the keys can be decrypted by using the other key. One of the two keys is referred to as a public key and is publicly disclosed. The other key is referred to as a private key and is known only to a party or parties that exchange secret messages.

Examples of the digital signature using the public key encryption are an RSA signature, a DSA signature, a Schnorr signature. Hereunder, the RSA signature and the DSA signature are described by way of example.

RSA Signature

First, the RSA signature is described below. Prime numbers p and q are generated. A number n is set to be a product of p and q as follows: n=pq.

Let $\lambda(n)$ denote the least common multiple of (p−1) and (q−1). Then, an appropriate exponent e, which is coprime to $\lambda(n)$, is selected. Also, another number d is set as follows: $d=e^{-1} \pmod{\lambda(n)}$. Then, a pair of the numbers e and n is used as a public key. Also, the number d is used as a private key. In the following description, "H( )" represents a hash function. An RSA signature on a document M is generated by performing the following step. That is, signature data s is computed as follows:

$$s = H(M)^d \bmod n$$

The RSA signature s on the document M is verified by performing the following step. That is, it is verified whether $H(M) = s^e \bmod n$.

DSA Signature

Next, the DSA signature is described below. Let p and q designate prime numbers. It is assumed that q is divisible by (p−1). Let g denote an element having an order q (a generator) optionally selected from $Z\_p^*$ that is a multiplicative group obtained by omitting 0 from a cyclic group Z_p having an order p. It is assumed that a number x optionally selected from the group Z_p* is a private key, and that a corresponding public key y is computed as follows: y=gx mod P.

A DSA signature on the document M is generated by performing the following procedure.

1) A number $\alpha$ is optionally selected from a group Z_q. Then, a number T is computed as follows: T=(g$\alpha$ mod p) mod q.
2) Then, a value c is computed as follows: c=H(M).
3) Subsequently, data s is computed as follows: s=$\alpha^{-1}$(c+xT) mod q. Signature data (s, T) are obtained.

The DSA signature data (s, T) on the document M are verified by performing the following step. That is, let y denote a public key (that is, y=g$\alpha$ mod p). Then, it is verified whether T=(gh (M)s$^{-1}$ y Ts$^{-1}$ mod p) mod q.

Public Key Authentication Infrastructure

Next, the public key authentication infrastructure is described below. When a resource of a server is accessed in communication between a client and the server, user authentication is required. A public key certificate according to ITU-T Recommendation X.509 is frequently used as one of means for user authentication. The public key certificate represents data that assures a connection between the public key and a user thereof. A digital signature of a responsible third party called a certification authority is attached to the public key certificate. A user authentication method using SSL (Secure Sockets Layer) is performed by checking whether a user has a private key corresponding to a public key included in a public key certificate that is presented by the user.

Because the signature of the certification authority is attached to the public key certificate, the public key corresponding to a user or a server, which is included in the public key certificate, can be trusted. Therefore, in a case where the private key used by the certification authority to generate the signature thereof is revealed or is weak, all public key certificates issued by this certification authority are invalid. Some certification authorities manage an enormous number of public key certificates. Thus, to reduce a management cost, various techniques have been proposed. Exemplary embodiments of the present invention, which are described later, have advantages in suppressing the number of certificates to be issued and reducing accesses to a server serving as a public key repository.

An example of the public key certificate according to ITU (International Telecommunication Union)-T recommendation X.509 v.3 includes information on an identification (ID) and a public key of an entity (or subject) to be certified. Signature data is generated by performing a signature operation, such as the aforementioned RSA algorithm, on a digest that is obtained by applying a hash function to data to be signed.

Figure 11:
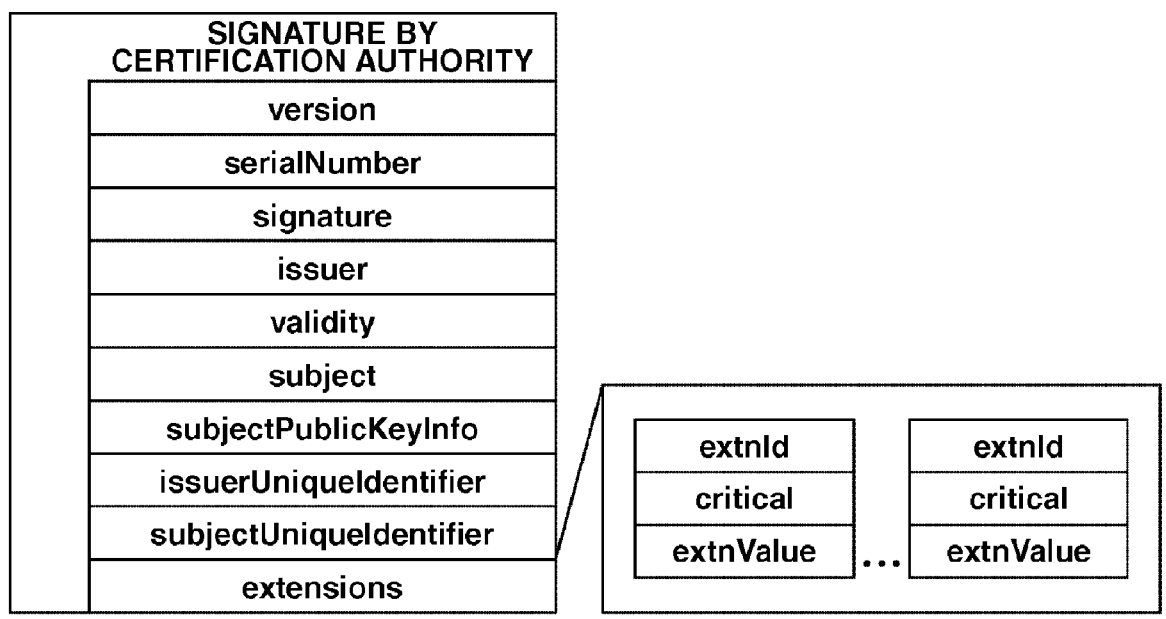
FIG. 11 is a diagram showing a public key certificate according to the first embodiment of the present invention.

Optional fields called "extensions" are provided in the data to be signed. Thus, this data may include new expansion data unique to an application program or to a protocol. FIG. 11 shows a format defined according to the ITU-T recommendation X.509 v.3. Information indicated in each of fields is described below. These fields are optionally provided therein. Information representing the version of the ITU-T recommendation X.509 is entered into a field named "version". When the entering of the information representing the version is omitted, the field "version" represents "v.1". Information representing a serial number uniquely assigned by the certification authority to a certificate is entered into a field named "serialNumber". Information representing a signature method employed to generate a public key certificate is entered into a field named "signature". Information representing an X.509 identification name corresponding to the certification authority, which is an issuer of a public key certificate, is entered into a field named "issuer". Information representing a valid period (a starting date and time and an ending date and time) of a public key is entered into a field named "validity". Information representing an X.500 identification name of a holder of a private key corresponding to a public key included in this certificate is entered into a field named "subject". Information representing a public key to be certified is entered into a field named "subjectPublicKeyInfo". Fields named "issuerUniqueIdentifer" and "subjectUniqueIdentifier" are optional fields added at the version 2. Unique identifier information representing the certification authority, and unique identifier information representing the holder are respectively entered into the fields named "issuerUniqueIdentifer" and "subjectUniqueIdentifier". A field named "extensions" is an optional field added at the version 3 and includes a set of three sets of subfields, that is, a subfield which stores information on an expansion type and is named "extnId", another subfield which stores information on an expansion value and is named "extnValue", and a still another subfield which stores information on a critical bit and is named "critical". Not only X.509 standard extension types but unique and new extension types may be incorporated into the v.3 extension field. A manner, in which the v.3 extension types are recognized, depends on the application program. The critical bit represents whether the extension type is indispensable or ignorable.

First Embodiment

Figure 1:
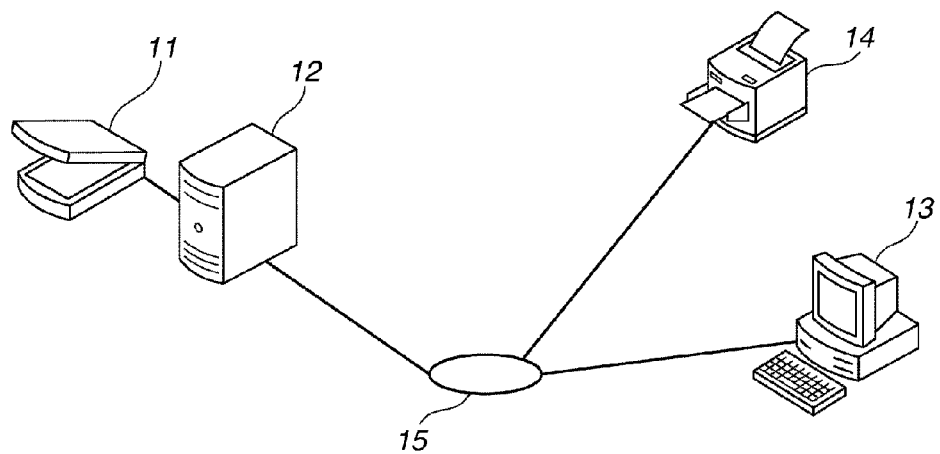
FIG. 1 is a conceptual diagram showing a system according to a first embodiment of the present invention.

FIG. 1 is a conceptual diagram showing a system according to a first embodiment of the present invention. In the system shown in FIG. 1, a scanner 11, a computer 12 adapted to generate an electronic document, a computer 13 adapted to edit and process an electronic document, and a printer 14 adapted to print an electronic document are connected to a network 15.

Figure 2:
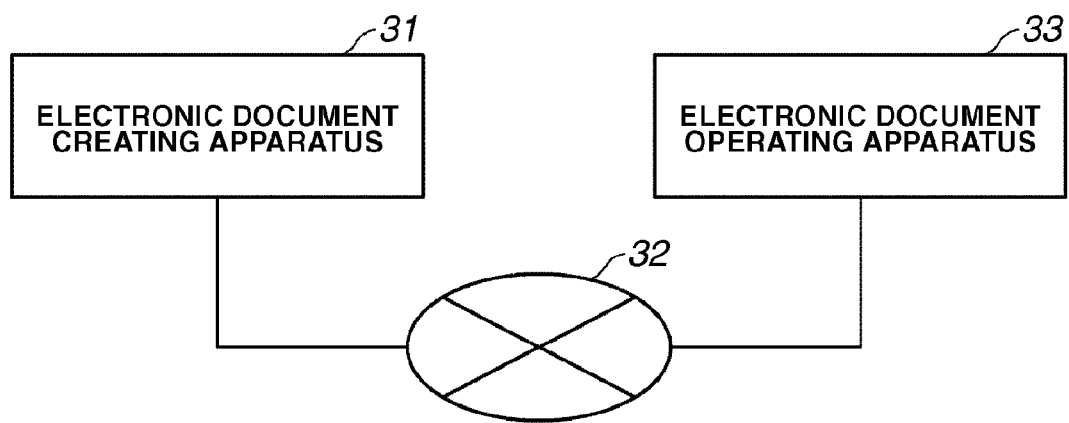
FIG. 2 is a block diagram showing the system according to the first embodiment of the present invention.

FIG. 2 is a block diagram showing the system that is conceptually shown in FIG. 1 and that is implemented according to the first embodiment of the present invention.

Image data is input to an electronic document creating apparatus 31. Key information corresponding to the image data is acquired. Also, a signature is attached to the image data. Subsequently, the image data, to which the signature is attached, is sent as an electronic document to an electronic document operating apparatus 33 through a network 32. The electronic document operating apparatus 33 verifies the image data received from the electronic creating apparatus 31. Also, the electronic document operating apparatus 33 processes, edits and prints the image data.

Figure 3:
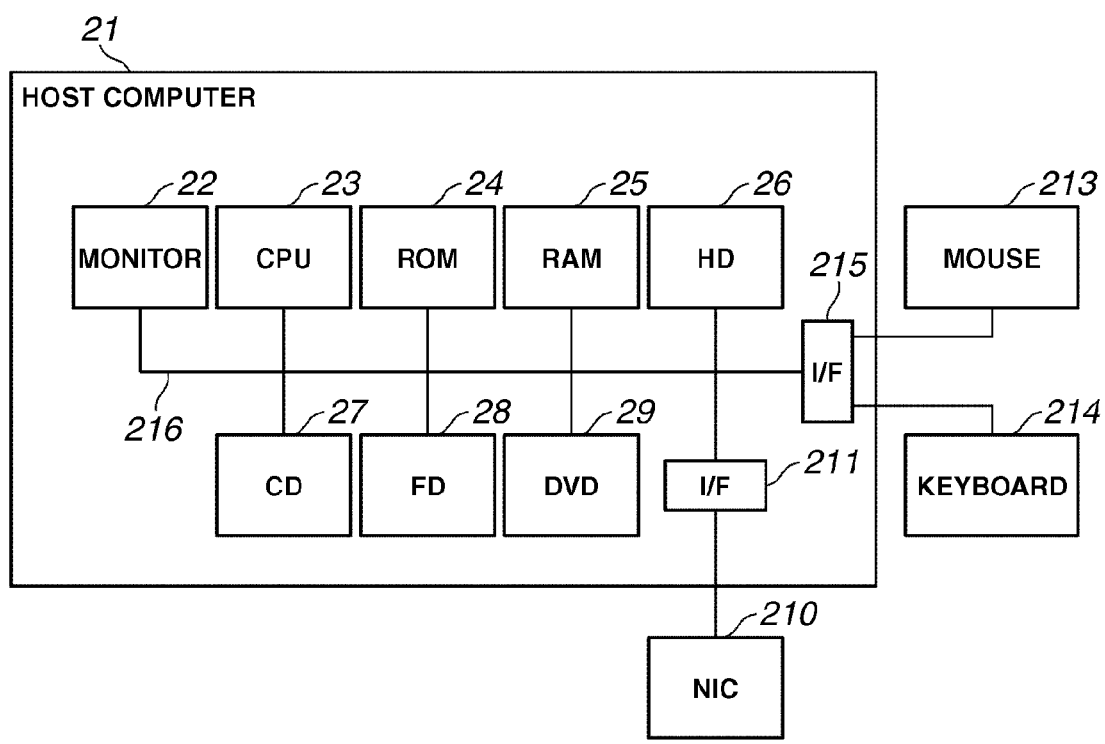
FIG. 3 is a block diagram showing the basic configuration of a host computer and peripheral devices in the first embodiment of the present invention.

Next, a host computer adaptable to the present embodiment is described below with reference to FIG. 3. FIG. 3 shows the basic structure of a host computer 21 that functions as both of the electronic document creating apparatus 31 and the electronic document operating apparatus 33 according to the present embodiment of the present invention. FIG. 3 also shows the relation between the host computer 21 and each peripheral unit. The host computer 21 is a personal computer that is generally in widespread use. Image data stored in a hard disk (HD) 26, a compact disk (CD) 27, a flexible disk (FD) 28, and a digital versatile disk (DVD) 29 can be displayed on the screen of a monitor 22. Image data can be distributed by a network interface card (NIC) 210 through the Internet. Various instructions from a user are input from a mouse 213 and a keyboard 214. In the host computer 21, blocks to be described later are connected to one another through a bus 216. Thus, various data can be transferred among the blocks.

A monitor 22 shown in FIG. 3 can display various kinds of information received from units provided in the host computer 21.

A central processing unit (CPU) 23 can control each of the units provided in the host computer 21 and also can execute a program loaded into a random access memory (RAM) 25. A read-only memory (ROM) 24 can store a basic input-output system (BIOS) program and a boot program. The RAM 25 temporarily stores a program and image data to be processed in the CPU 23. An operating system (OS) program and other programs to be executed by the CPU 23 are loaded into the RAM 25.

The HD 26 is used to store the OS program and the other programs to be transferred to the RAM 25. While the unit operates, the unit causes the HD 26 to store image data, and also read the image data therefrom. A compact disk read-only memory (CD-ROM) drive 27 is enabled to read data, which is stored in a CD-ROM or a compact disk recordable (CD-R) serving as one of an external storage medium, and to write data thereto.

An FD drive 28 is enabled to read data, which is stored in an FD, and to write data thereto, similarly to the CD-ROM drive 27. A DVD-ROM/DVD-RAM drive 29 is enabled to read data, which is stored in a DVD-ROM or DVD-RAM, and to write data to a DVD-RAM, similarly to the CD-ROM drive 27. In a case where image processing programs are stored in a CD-ROM, an FD, and a DVD-ROM, these programs are installed in the HD 26. When needed, the programs are transferred to the RAM 25.

An interface (I/F) unit 211 is used to connect the host computer 21 to the NIC 210 that is adapted to connect image data, which is stored in the RAM 25, the HD 26, the CD-ROM 27, the FD 28, and the DVD 29, to a network, such as the Internet. The host computer 21 transmits data to the Internet through the I/F unit 211, and receives data from the Internet through the I/F unit 211.

An I/F unit 215 is used to connect the mouse 213 and the keyboard 214 to the host computer 21. Various instructions are input from the mouse 213 and the keyboard 214 to the CPU 23 through the I/F unit 215.

Electronic Document Creation

Figure 4:
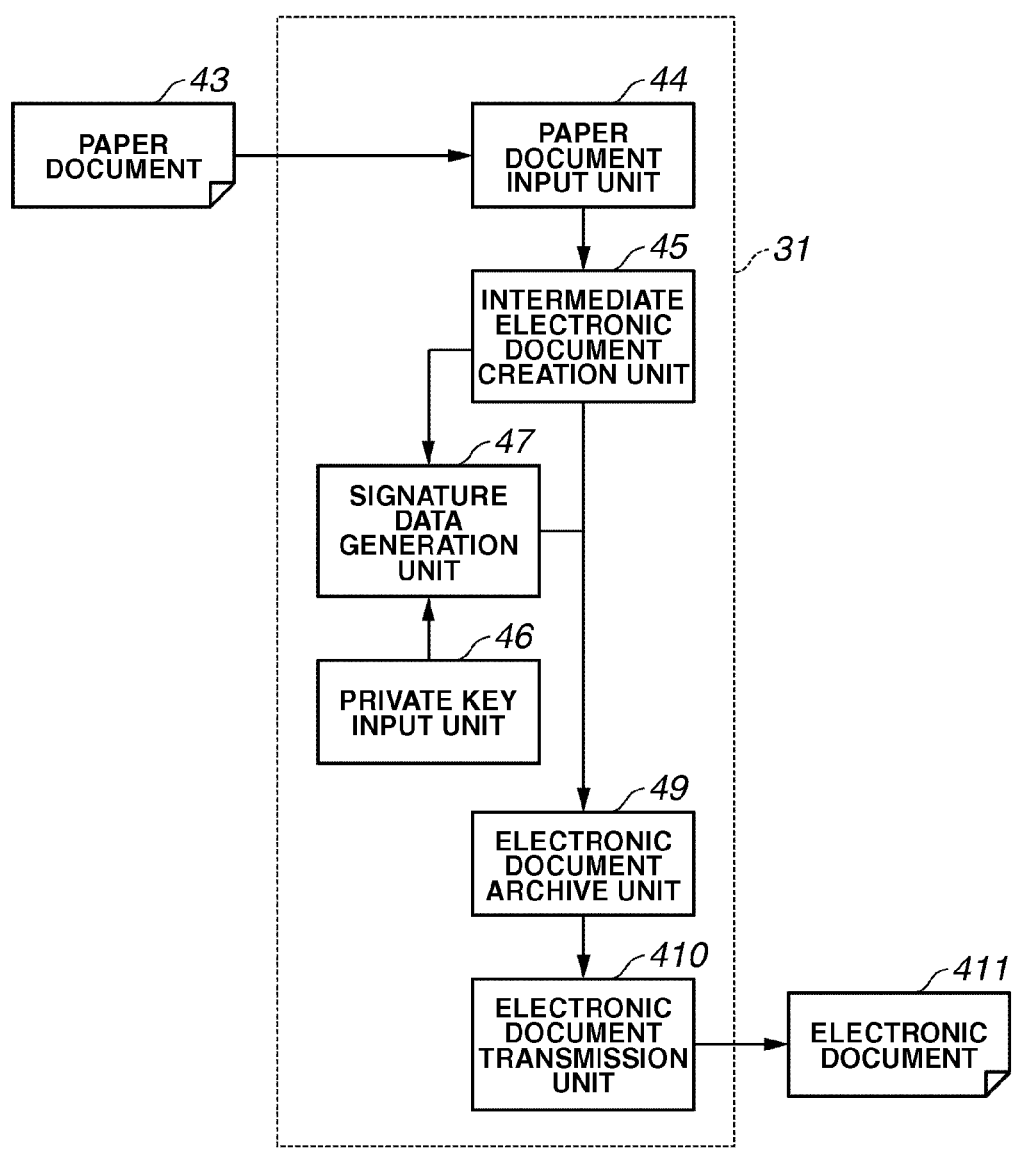
FIG. 4 is a block diagram showing an electronic document creating apparatus according to the first embodiment of the present invention.

Next, an electronic document creating unit adaptable to the present embodiment is described below. FIG. 4 is a functional block diagram illustrating the electronic document creating apparatus 31 according to the present embodiment.

The electronic document creating apparatus 31 includes a paper document input unit 44 adapted to input data of a paper document 43, an intermediate electronic document creation unit 45 adapted to analyze the paper document 43 and to create an intermediate electronic document, a signature data generation unit 47 adapted to generate signature data from the intermediate electronic document and a private key input from a private key input unit 46, an electronic document archive unit 49 adapted to create an electronic document by integrating the intermediate electronic document and the signature data, and an electronic document transmission unit 410 adapted to transmit the electronic document to the electronic document operating apparatus 33.

Figure 5:
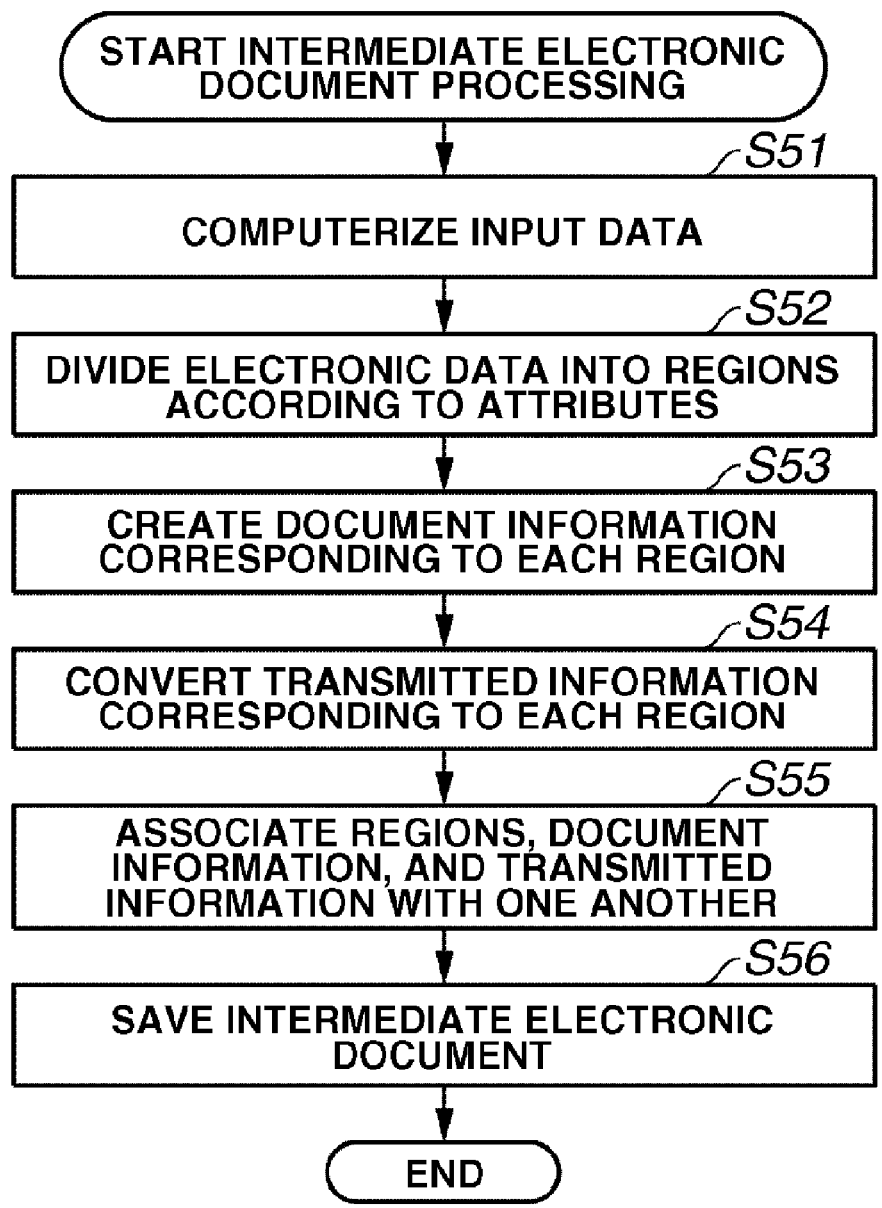
FIG. 5 is a flowchart showing an intermediate electronic document creation process according to the first embodiment of the present invention.

First, the intermediate electronic document creation unit 45 is described in detail below. FIG. 5 is a flowchart showing a process performed in the intermediate electronic document creation unit 45 according to the present embodiment of the present invention.

Figure 9A:
FIGS. 9A and 9B show an example of computerized data according to the first embodiment of the present invention.

In step S51, data obtained from the paper document input unit 44 is computerized. FIG. 9A shows an example of data computerized in this step. Then, in step S52, the electronic data is divided into regions respectively corresponding to attributes that are, for example, characters, photographs, tables, and diagrams.

A practical example of the technique for dividing the electronic data into regions is described in U.S. Pat. No. 5,680, 478. In this example, sets of blocks of black pixels and blocks of white pixels in a document image are extracted. Then, according to feature quantities, such as shapes, sizes, and conditions of the sets, regions respectively named "character", "graphic", "diagram", "table", "frame" and "line" are extracted.

Figure 9B:
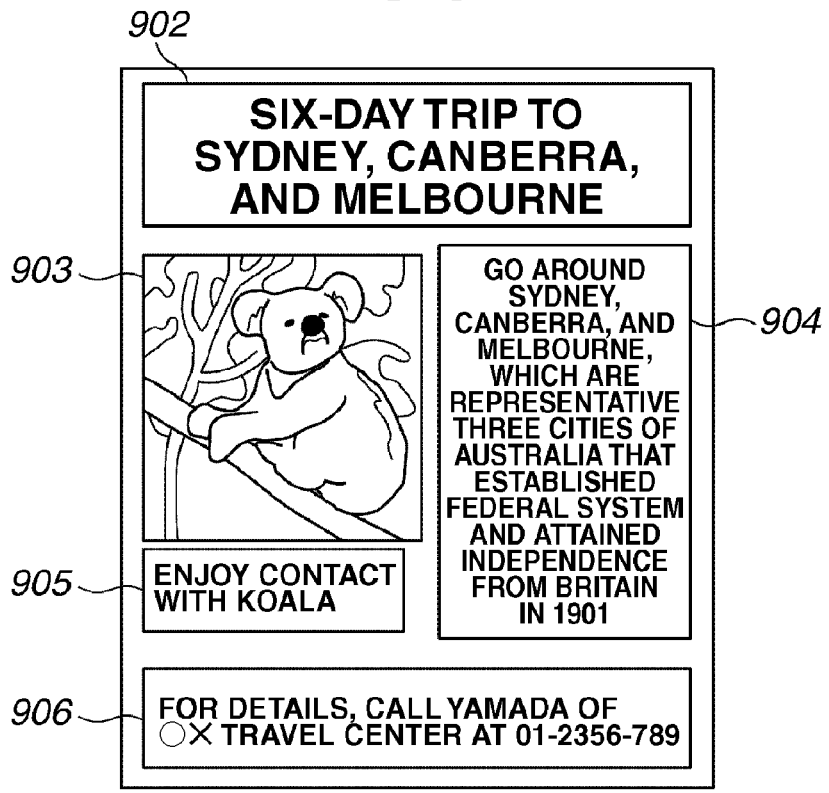

For instance, FIG. 9B shows a result of determining the attributes according to the extracted feature-quantities and of dividing the image into regions. Regions 902, 904, 905, and 906 are character regions, while a region 903 is a color photograph region.

Subsequently, in step S53, document information corresponding to each of the regions obtained in the precedent step. The "document information" includes attribute information, layout information which represents, for example, the position coordinate of a page, and document logical structure information which represents a character code string, a paragraph, and a title in a case where the attribute of the region is, for example, "character".

In step S54, transmitted information is converted corresponding to each of the regions obtained in the precedent step. The "transmitted information" is information needed for rendering. More specifically, for example, file sizes of variable-resolution raster images, vector images, monochrome images, or color images, into which the regions are converted. For instance, in a case where the attribute of the regions obtained by dividing the image data is "character", the transmitted information includes information on texts obtained as a result of character recognition, positions and fonts of individual characters, and degrees of reliability of characters obtained by character recognition.

The regions shown in FIG. 9B are assumed that character regions 902, 904, 905, and 906 are converted into vector images, and that a color photograph region 903 is converted into a color raster image.

Subsequently, in step S55, the regions obtained in step S52, the document information generated in step S53, and the transmitted information converted in step S54 are associated with one another. The associated pieces of information are described as having a tree structure.

In step S56, the data, which have been generated in the precedent step and before then, are stored as an intermediate electronic document. As long as the tree structure can be represented, any format of documents to be stored can be employed. The present embodiment employs an XML format that is an example of a structured document format.

Figure 6:
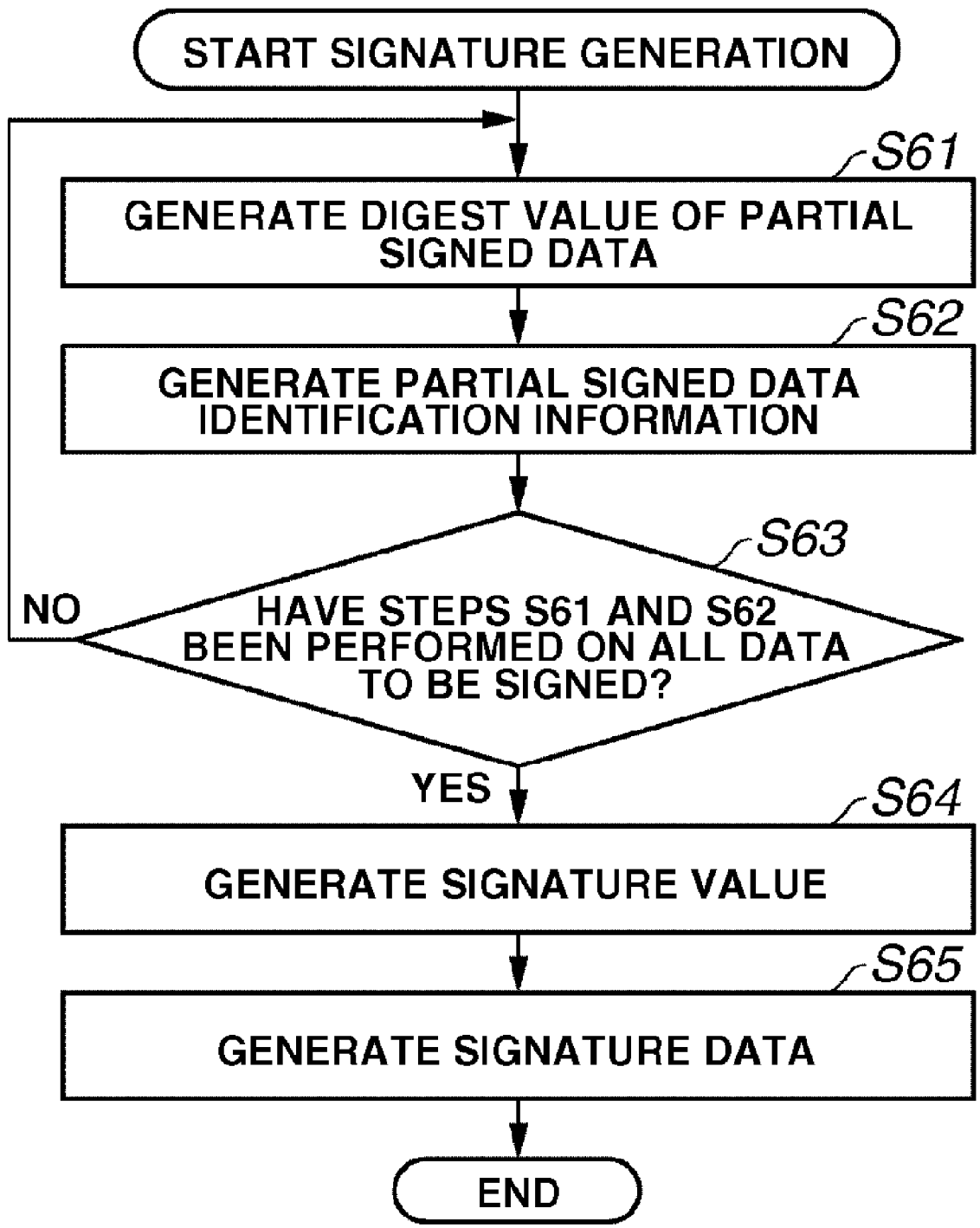
FIG. 6 is a flowchart showing a signature data generation process according to the first embodiment of the present invention.

Next, the signature data generation unit 47 is described in detail below. FIG. 6 is a flowchart illustrating a process to be performed in the signature data generation unit 47 according to the present embodiment. It is assumed that signed data, which is an object of signature, includes a plurality of partial signed data. Each partial signed data may be considered as a unit of data to be signed.

First, in step S61, a digest value of the partial signed data is generated corresponding to each of the plurality of partial signed data. The partial signed data is data to be signed, which is included in an intermediate electronic document. The partial signed data includes transmitted information a 121, transmitted information b 122, and document information 123 shown in FIGS. 12A and 12B. According to the present embodiment, a hash function is applied to generate a digest value of signed data.

Subsequently, in step S62, identification information on the partial signed data is generated corresponding to each of the plurality of partial signed data. As long as the partial signed data can uniquely be identified according to the identification information, any information may be employed as the identification information. According to the present embodiment, a uniform resource identifier (URI) according to Request for Comments (RFC) 2396 is employed as the identification information corresponding to the partial signed data. However, the identification information according to the present invention is not limited thereto. Various values may be applied to the identification information. Each of the plurality of the partial signed data has identification information. According to the identification information, the partial signed data corresponding thereto can be identified.

In step S63, it is determined whether processing in steps S61 and processing in step S62 are performed on all of signed data that are objects to be signed. In a case where the processing in steps S61 and the processing in step S62 have been performed on all of the signed data, the process proceeds to step S64. Otherwise, the process returns to step S61.

In step S64, a digest value of signed data is generated by applying a hash function to digest values of the plurality of partial signed data, which are generated in step S61, and the identification information of each of the plurality of partial signed data, which is generated in step S62. Then, signature processing is performed on the digest values generated in step S64 using a private key. Thus, signature values are calculated. According to the present embodiment, a digital signature is employed to calculate the signature values.

Subsequently, in step S65, signature data is generated using the digest values of the plurality of the partial signed data, which are generated in step S61, the identification information corresponding to each of the plurality of partial signed data, which is generated in step S62, and the signature values generated in step S64. Then, the signature generation process is finished.

The signature data according to the present embodiment is described below with reference to FIGS. 7A and 7B which illustrate an example of the signature data applicable to the present invention. FIG. 7A shows the entire electronic document 411 that includes signature data 71, partial signed data 1 (72), and partial signed data 2 (73). FIG. 7B illustrates the signature data, which is shown in FIG. 7A, in detail. As shown in FIG. 7B, the signature data 71 includes a signature value 74, identification information 75 corresponding to the partial signed data 1, a digest value 76 of the partial signed data 1, identification information 77 corresponding to the partial signed data 2, and a digest value 78 of the partial signed data 2.

In the example shown in FIG. 7A, the electronic document 411 includes one signature data 71 with respect to two partial signed data 72 and 73. FIG. 7B illustrates the configuration of the signature data 71 in detail.

The identification information 75 corresponding to the partial signed data 1, and the identification information 77 corresponding to the partial signed data 2 shown in FIG. 7B are generated in step S62. The digest value 76 of the partial signed data 1, and the digest value 78 of the partial signed data 2 shown in FIG. 7B are generated in step S61. The signature value 74 is generated in step S64 from the identification information 75 corresponding to the partial signed data 1, the digest value 76 of the partial signed data 1, the identification information 77 corresponding to the partial signed data 2, and the digest value 78 of the partial signed data 2.

Next, the electronic document archive unit 49 is described below with reference to FIGS. 12A and 12B.

Information 121 and information 122 are the transmitted information corresponding to an intermediate electronic document generated in the intermediate electronic document creation unit 45. Information 123 is document information corresponding thereto. Signature data 124 is generated in the signature data generation unit 47. As described above, the signature data includes pieces of identification information, which indicate the transmitted information corresponding to the partial signed data, and the document information, respectively. As shown in FIG. 12A, identification information 126 designating the transmitted information 121, identification information 127 designating the transmitted information 122, and identification information 128 designating the document information 123 are embedded in the signature data 124.

Figure 12A:
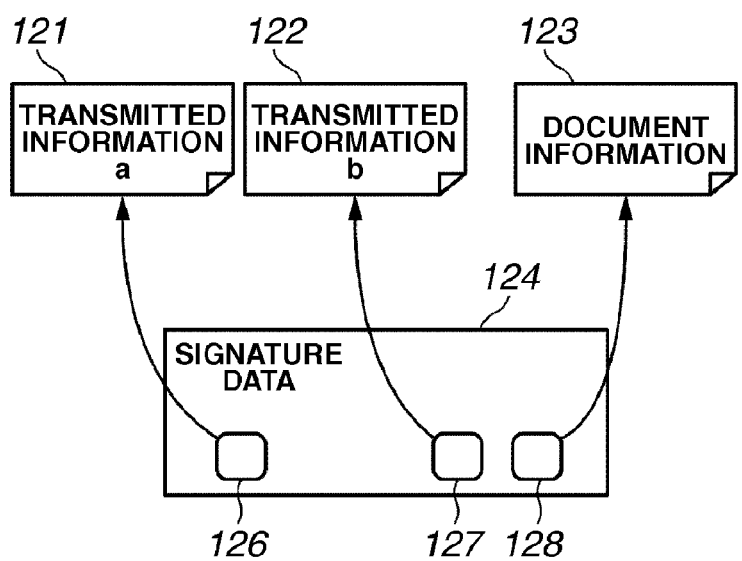
FIGS. 12A and 12B show an intermediate electronic document and computerized data according to the first embodiment of the present invention.

As shown in FIG. 12A, the transmitted information and the document information corresponding to the intermediate electronic document created in the intermediate document creation unit 45, and the signature data generated in the signature data generation unit 47 are present as individual data. The electronic document archive unit 49 combines files of these information and data into one file to thereby generate an electronic document. FIG. 12B is a schematic diagram for describing such an operation of the electronic document archive unit 49. Archive data 129 corresponds to the electronic document 411 shown in FIG. 4.

Figure 12B:
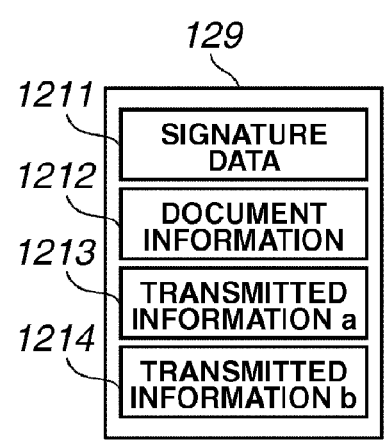

The information 121, the information 122, the information 123, and the data 124 shown in FIG. 12A correspond to the information 1213, the information 1214, the information 1212, and the data 1211 shown in FIG. 12B, respectively.

Electronic Document Operation

Figure 13:
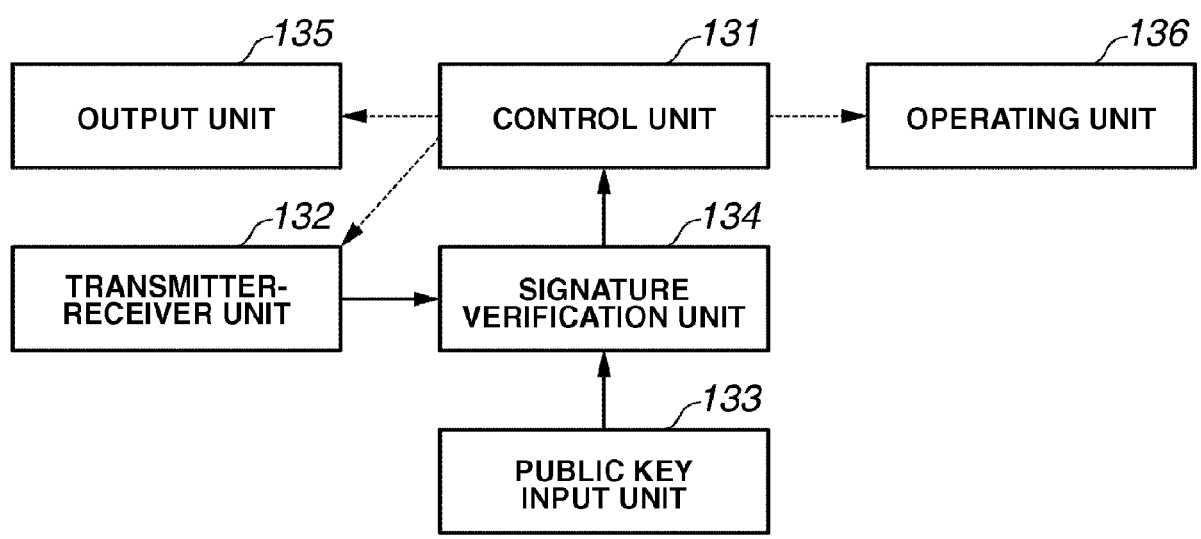
FIG. 13 is a block diagram showing an electronic document operating apparatus according to the first embodiment of the present invention.

Next, the electronic document operating apparatus 33 adaptable to the present embodiment is described below. FIG. 13 is a functional block diagram illustrating the electronic document operating apparatus 33 adaptable to the present embodiment.

The electronic document operating apparatus 33 according to the present embodiment includes a transmitter-receiver unit 132, a public key input unit 133, a signature verification unit 134, a control unit 131, an output unit 135, an operating unit 136.

An electronic document received by the transmitter-receiver unit 132 is the same data as the electronic document 411 transmitted by the electronic document creating apparatus 31 shown in FIG. 4. Especially, according to the present embodiment, the transmitter-receiver unit 132 receives respective partial data constituting an electronic document, respectively, instead of receiving the entire electronic document at once. This receiving process will be described in detail later.

The public key input unit 133 inputs key data corresponding to the private key used in the signature data generation unit 47 in the electronic document creating apparatus 31 (FIG. 4). Public key data contained in a public key certificate shown in FIG. 11 may be input as data representing a public key.

The signature verification unit 134 verifies a signature included in the input electronic document using the key data input by the public key input unit 133. Also, the signature verification unit 134 controls the control unit 131 according to a result of verification of the signature.

The control unit 131 controls transmission and reception of data to and from the transmitter-receiver unit 132. Alternatively, the control unit 131 controls an operation of outputting a received electronic document to the output unit 135. Alternatively, the control unit 131 controls processing and editing of a received electronic document at the operating unit 136.

Figure 8:
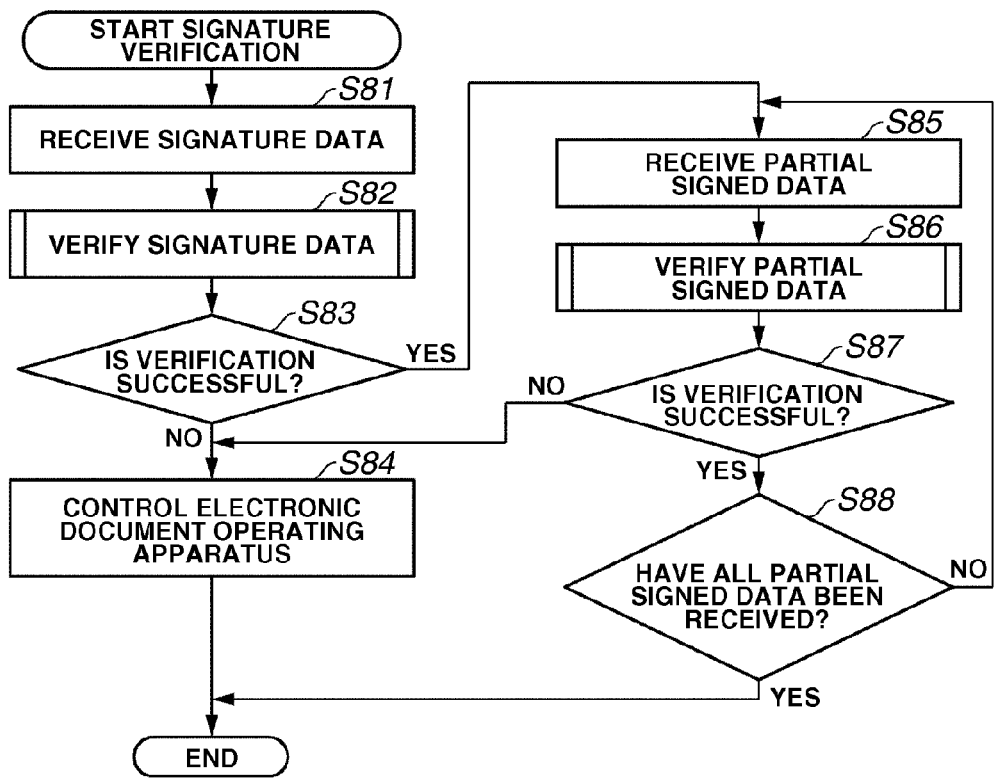
FIG. 8 is a flowchart showing a signature verification process according to the first embodiment of the present invention.

Hereinafter, a signature verification process and a control process to be performed in the signature verification unit 134 are described in detail. FIG. 8 is a flowchart showing processes to be performed in the signature verification unit 134 and the control unit 131 according to the present embodiment.

First, in step S81, the signature verification unit 134 receives signature data that is the signature data 71 shown in FIG. 7A. Thus, according to the present embodiment, the signature verification unit 134 receives the respective partial data constituting an electronic document, respectively, instead of receiving the entire electronic document (data 71, 72, and 73) at once. It should be noted that in step S81, the signature verification unit 134 has not yet received the partial signed data 1 or the partial signed data 2.

Figure 14:
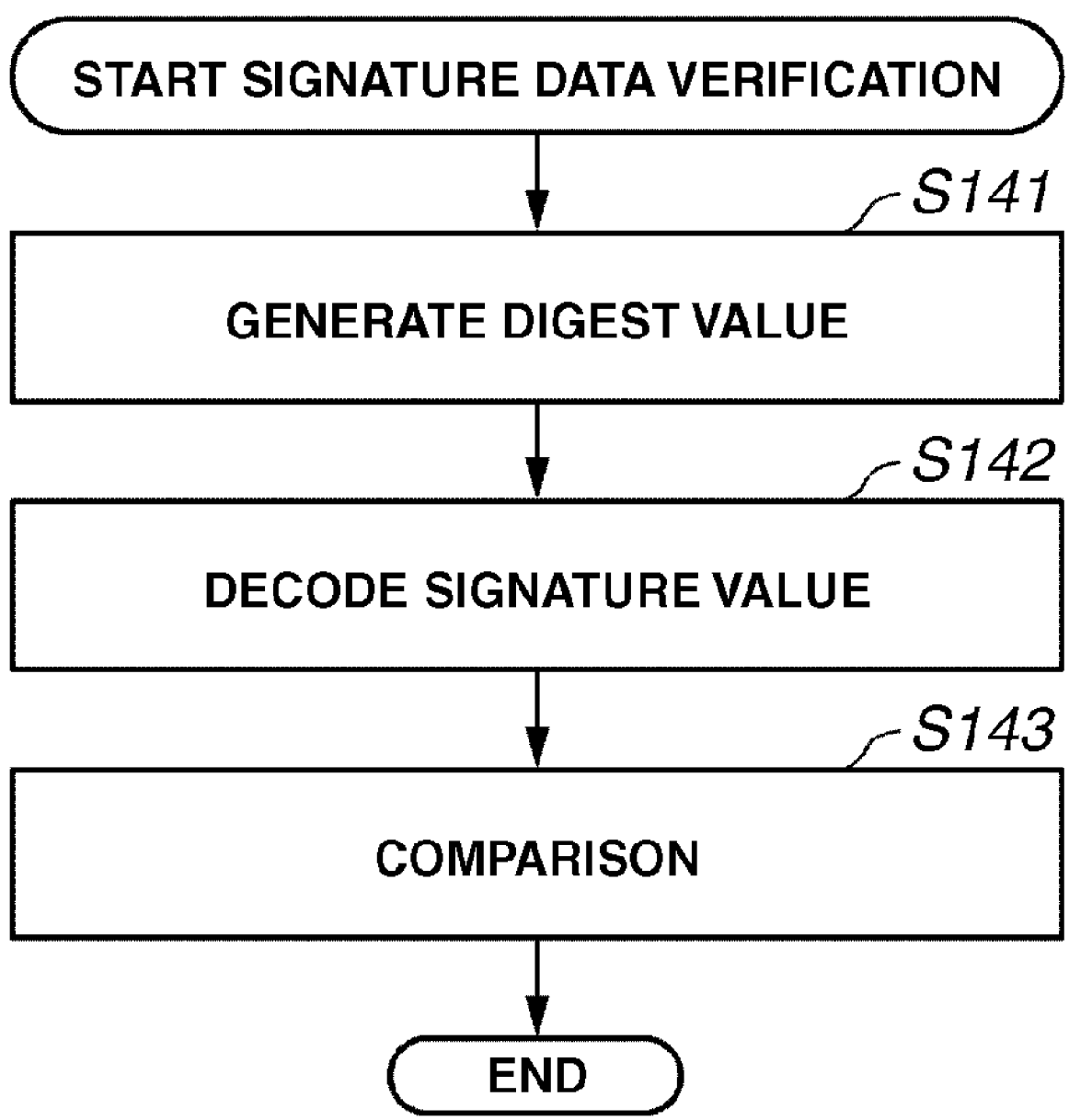
FIG. 14 is a flowchart showing a signature data verification process according to the first embodiment of the present invention.

Subsequently, in step S82, the verification of the signature data is performed using the received signature data. A signature data verification process is described below in detail with reference to FIG. 14. FIG. 14 is a flowchart illustrating the signature data verification process according to the present embodiment.

First, in step S141, a digest value of the signature data is calculated from identification information of the partial signed data and the digest value of the partial signed data, which are included in the signature data received in step S81, by using the hash function. In the case of the example shown in FIG. 7B, the digest value of the signature data is generated from the identification information 75 of the partial signed data 1, the digest value 76 of the partial signed data 1, the identification information 77 of the partial signed data 2, and the digest value 78 of the partial signed data 2.

Subsequently, in step S142, a signature value included in the signature data received in step S81 is decrypted using the public key input by the public key input unit 133. For instance, in the case of the example shown in FIG. 7B, the signature value 74 is decrypted using the public key.

Then, in step S143, the digest value generated in step S141 is compared with the value obtained by decryption in step S142.

Subsequently, in step S83 (FIG. 8), it is determined according to a result of the signature data verification performed in step S82 whether the signature data verification is successful. If the verification is successful (that is, it is determined in step S143 that the digest value generated in S141 is equal to the value obtained by the decryption performed in step S142), the process proceeds to step S85. If unsuccessful, the process proceeds to step S84.

In step S84, the control unit 131 controls the electronic document operating apparatus 33. In the present embodiment, the control unit 131 issues an instruction that causes the electronic document creating apparatus 31 to stop data transmission/reception. The control unit 131 controls the transmitter-receiver unit 132 so that the electronic document operating apparatus 33 does not perform a data receiving process.

A method of controlling the apparatus according to the present embodiment is not limited thereto. The apparatus can be controlled by various methods. For example, the control unit 131 may transmit an instruction to the electronic document creating apparatus 31 so that the instruction causes the apparatus 31 to perform retransmission of the signature data and that the control unit 131 performs verification of the signature data again using the retransmitted signature data. This control operation is performed by considering a case where first transmission of the signature data may be unsuccessful due to a transmission error occurring in the middle of a transmission line, and where the verification of the signature data is performed again. The control unit 131 may cause the electronic document operating apparatus 33 to perform an operation of stopping reception of the signature data in a case where the retransmission of the signature data is performed a predetermined number of times, and where the verification has failed a predetermined number of times.

An example of another operation of controlling the apparatus is to control the output unit 135 so that only in a case where the verification of the signature data is successful, the data is output to, for instance, a printer or a display unit, and in a case where the verification thereof has failed, the data is not output.

Alternatively, the operating unit 136 may be controlled so that the edition and the processing of the data are performed only in a case where the verification of the signature data is successful, and that the edition and the processing of the data cannot be performed in a case where the verification thereof is unsuccessful.

Meanwhile, in step S85, the signature verification unit 134 receives the partial signed data. The partial signed data corresponds to the partial signed data 1 (72) or the partial signed data 2 (73) shown in FIG. 7B. Especially, according to the present embodiment, in a case where there is a plurality of pieces of partial signed data, the signature verification unit 134 receives the respective partial signed data individually, instead of receiving all of the partial signed data combined by the electronic document archive unit 49 at the same time. Note that, for example, in the case of the example shown in FIG. 7A, only the partial signed data 1 (72) is received when the processing in step S85 is first performed.

Figure 15:
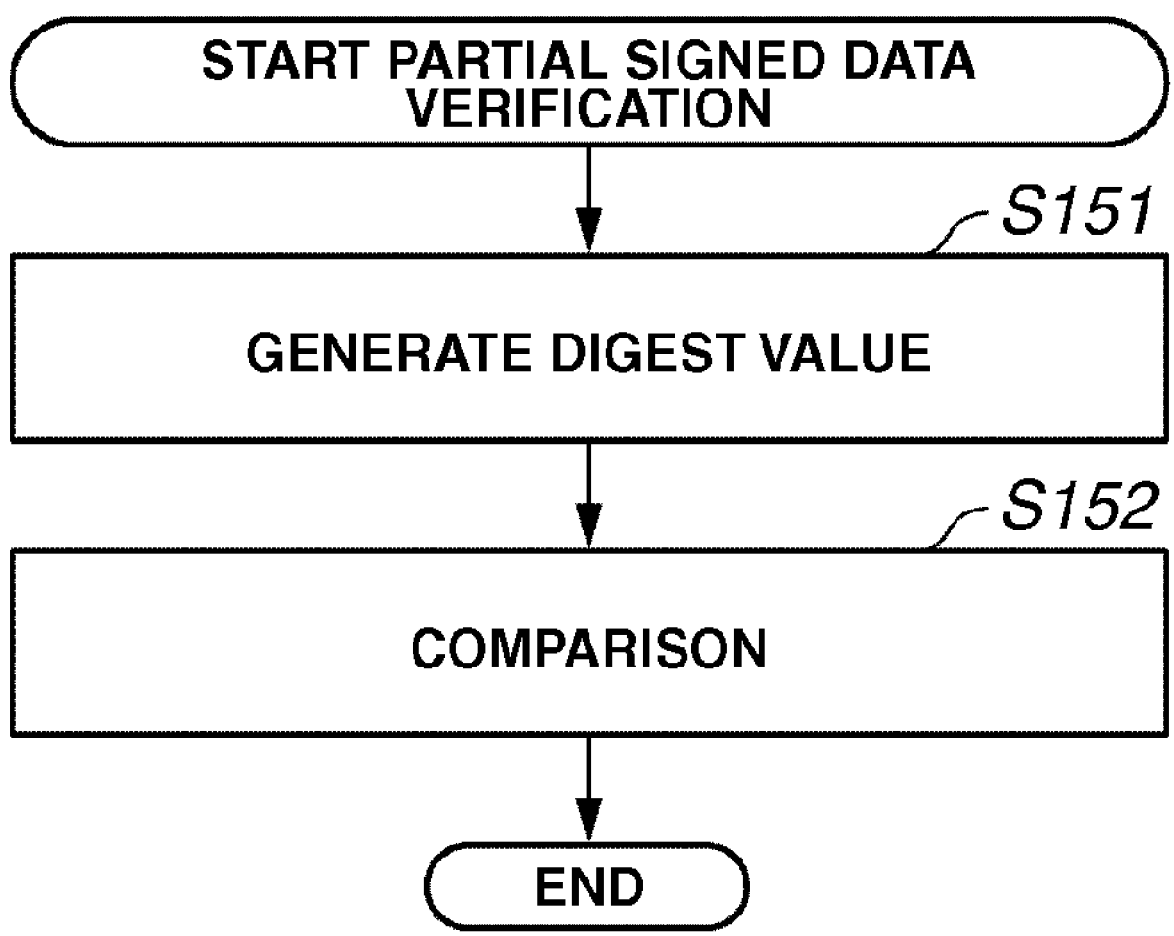
FIG. 15 is a flowchart showing a partial signed data verification process according to the first embodiment of the present invention.

Subsequently, in step S86, the verification of the partial signed data is performed using the received partial signed data. The verification of the partial signed data according to the present embodiment is described in detail below with reference to FIG. 15. FIG. 15 is a flowchart showing a partial signed data verification process according to the present embodiment.

First, in step S151, the signature verification unit 134 calculates a digest value of the partial signed data from the partial signed data received in step S85 using the hash function.

Then, in step S152, the signature verification unit 134 compares the digest value generated in step S151 with the digest value included in the signature data received in step S81. At that time, the data to be signed, which corresponds to the partial signed data, can be verified according to the identification information of the partial signed data included in the signature data.

Subsequently, in step S87 (FIG. 8), it is determined according to a result of the partial signed data verification process performed in step S86 whether the verification is successful. If the verification is successful (that is, it is determined that the digest value generated in step S151 is equal to the digest value included in the signature data which is received in step S81), the process proceeds to step S88. Otherwise, the process returns to step S84.

Then, in step S88, it is determined whether all of the partial signed data are received. If not, the process returns to step S85. Otherwise, the verification process is finished.

An example of the above-described signature data verification process is described below with reference to FIGS. 16A to 16D. FIGS. 16A to 16D illustrate an example of the signature data verification process according to the present embodiment. In the example illustrated in FIGS. 16A to 16D, the document data created by the electronic document creating apparatus 31 includes signature data (161), partial signed data 1 (162), partial signed data 2 (163), partial signed data 3 (164), and partial signed data 4 (165).

Figure 16A:
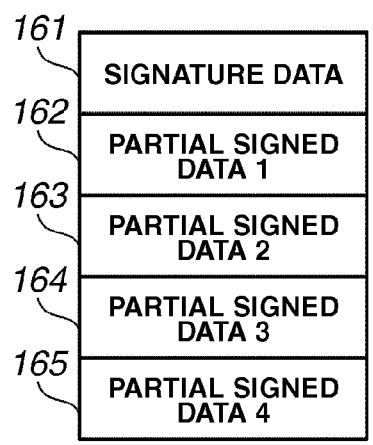
FIGS. 16A to 16D show examples of the signature data verification process according to the first embodiment of the present invention.
Figure 16B:
Figure 16C:
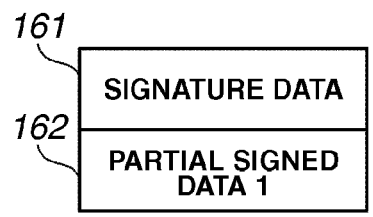
Figure 16D:
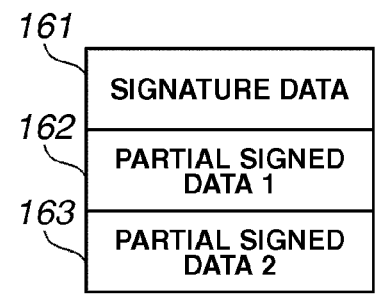

First, as shown in FIG. 16B, only the signature data 161 is received by the electronic document operating apparatus 33 in step S81. Then, the verification of the received signature data 161 is performed therein in step S82. If the verification is successful, the electronic document operating apparatus 33 subsequently receives the partial singed data 1 (162) in step S85, as shown in FIG. 16C. Then, the electronic document operating apparatus 33 performs verification of the received partial signed data 1 (162) in step S86. If the verification is successful, the operating apparatus 33 subsequently receives the partial signed data 2 (163) in step S85, as shown in FIG. 16D. Then, the operating apparatus 33 performs verification of the received partial signed data 2 (163) in step S86. After this, similar processing is performed on the partial signed data 3 (164) and the partial signed data 4 (165). Thus, a description of the processing performed thereon is omitted.

As illustrated in FIGS. 16A to 16D, the present embodiment sequentially receives the partial signed data, without receiving all of the signature data and the signed data at the same time. Then, the present embodiment performs the verification process in real time using the received partial signed data and is enabled to control the apparatus according to a result of the verification.

According to the present embodiment, the verification of the signature data is unsuccessful, for example, in a case where the data is not signed by a rightful holder of a private key corresponding to a public key (that is, a case where an electronic document is falsified). Alternatively, in a case where the digest value of the partial signed data included in the signature data is falsified, or where the identification information of the partial signed data is falsified, the verification of the signature data is unsuccessful. In such a case, the apparatus is controlled, as described above. Consequently, the necessity for receiving the falsified partial signed data resulting in unsuccessful verification of the signature data can be eliminated. Thus, the present embodiment is efficient.

Also, a signature value is generated by arranging the digest values of and pieces of the identification information respectively corresponding to the partial signed data in the order of receiving the partial signed data at a reception unit side. The present embodiment can verify whether there is a missing piece of the partial signed data, and whether the partial signed data are received in a correct order.

Furthermore, for example, in a case where the partial signed data is falsified, the verification of the partial signed data is unsuccessful. In this case, according to the present embodiment, the apparatus is controlled, as described above. Consequently, the need for receiving the subsequent partial signed data is eliminated. Thus, the present embodiment is efficient.

Second Embodiment

According to the first embodiment, the verification of signature data is performed by first receiving the signature data. Subsequently, the verification of the partial signed data is performed. According to a second embodiment, signature data is partially received. Then, an apparatus is controlled while it is verified whether a piece of the partial signed data is deleted, and whether the order, in which the received partial data are arranged, is falsified. Although the first embodiment describes the example of the electronic document including a plurality of components (that is, pieces of document information and transmitted information), moving image data, whose partial data respectively have sequence numbers, is employed by way of example in the following description of the second embodiment.

Overall Structure

Figure 17:
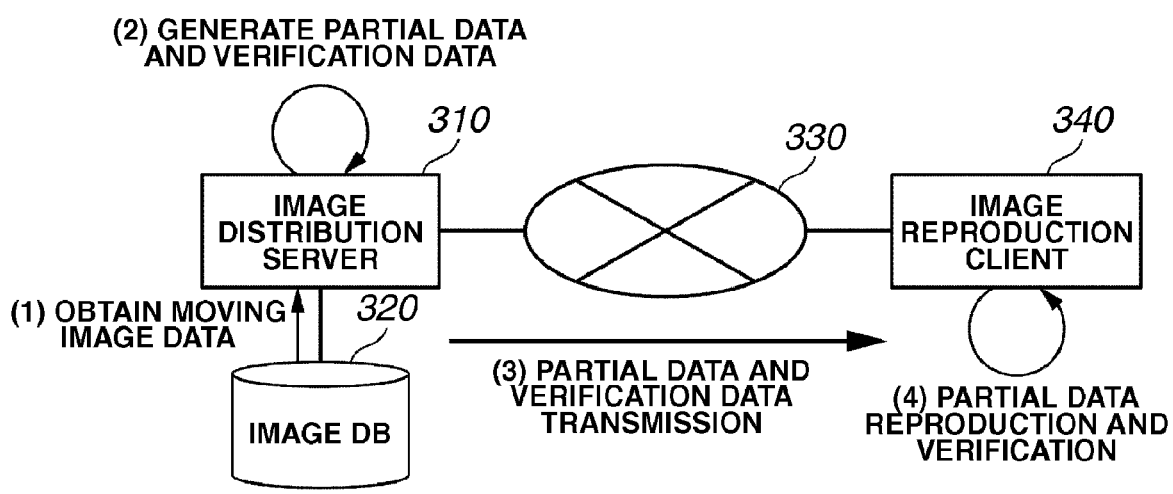
FIG. 17 is a block diagram showing a system according to a second embodiment of the present invention.

Referring first to FIG. 17, there is shown an outline of a system according to the present embodiment. The system according to the present embodiment includes an image distribution server 310, an image database (DB) 320, a network 330, and an image reproduction client 340.

As shown in FIG. 17, the image distribution server 310 responds to an image-data acquisition request received from the image reproduction client 340 and distributes image data stored in the image DB 320. In the present embodiment, the image distribution server 310 generates verification data, according to which the image reproduction client 340 can verify whether the image data is falsified, and transmits the verification data to the image reproduction client 340, in addition to the image data.

The image reproduction client 340 transmits a desired-image-data acquisition request to the image distribution server 310. Subsequently, the image reproduction client 340 reproduces image data distributed from the image distribution server 310 through the network 330. In the present embodiment, the image reproduction client 340 receives, in addition to the image data, the verification data corresponding to the image data. Then, the image reproduction client 340 verifies whether the image data is falsified.

The image distribution server 310 and the image reproduction client 340 are connected to each other through a network 330, such as the Internet. The image distribution server 310 and the image reproduction client 340 can exchange various data. Each of the image distribution server 310 and the image reproduction client 340 may be constituted by a general-purpose apparatus, such as an ordinary personal computer. A process flow is briefly described below.

A user utilizes the image reproduction client 340 and requests desired image data from the image distribution server 310. The image distribution server 310 acquires image data, which is requested by the image reproduction client 340, from the image DB 320 and divides the acquired image data into partial data. Simultaneously, the image distribution server 310 generates verification data corresponding to the partial data obtained by the division. Then, the image distribution server 310 transmits the partial data and the generated verification data sequentially to the image reproduction client 340. The image reproduction client 340 receives the partial data and the verification data, and utilizes the verification data to verify whether the received partial image data is correct. Also, the image reproduction client 340 reproduces the received partial data and deletes the partial data upon completion of reproduction thereof.

Thus, the outline of the system according to the present embodiment has been described above.

The basic configuration of the host computer functioning as the image reproduction client and the image distribution server according to the present embodiment are similar to that of the host computer shown in FIG. 3. Therefore, the description of the basic configuration of the host computer according to the present embodiment is omitted.

Verification Data Generation Process

Next, the verification data generation unit adaptable to the present embodiment is described below with reference to FIG. 18.

Figure 18:
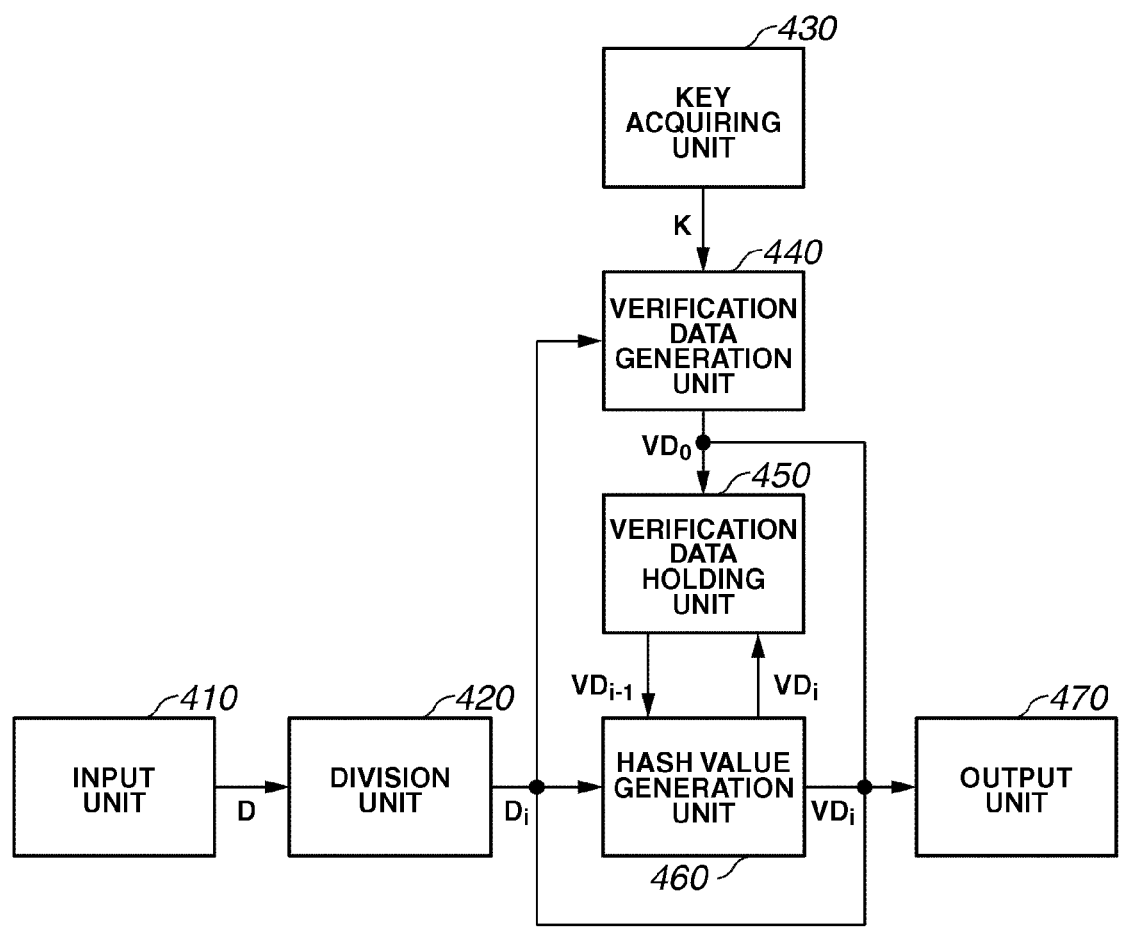
FIG. 18 is a block diagram showing units used to perform a verification data generation process according to the second embodiment of the present invention.

FIG. 18 is a block diagram illustrating a verification data generation function according to the present embodiment. As shown in FIG. 18, the verification data generation unit includes an input unit 410, a division unit 420, a key acquiring unit 430, a verification data generation unit 440, a verification data holding unit 450, a hash value generation unit 460, and an output unit 470.

The verification data generation function illustrated in FIG. 18 is mounted in the image distribution server 310 (see FIG. 17).

First, the input unit 410 is described below. Image data D is input from the image DB 320 to the input unit 410. The input unit 410 outputs the input image data D.

In the present embodiment, moving image data according to Motion JPEG (Joint Photographic Experts Group) or Motion JPEG 2000, the respective frames of which are respectively compression-coded independent of one another, is employed as the image data D. However, image data, to which the present embodiment is applied, is not limited thereto. Various compression-coding methods utilizing an inter-frame correlation, such as an MPEG (Moving Picture Experts Group), can be employed as the image data D.

Next, the division unit 420 is described below. The image data D output from the input unit 410 is input to the division unit 420. The division unit 420 divides the image data D into a plurality of partial image data $D_i$. Then, the division unit 420 outputs the partial image data $D_i$ obtained by the division.

It is assumed that the image data D is divided into frames according to the present embodiment. That is, the partial image data $D_i$ represents each of frame data included in the image data D. However, the partial image data $D_i$ according to the present embodiment is not limited thereto. The image data D may be divided into optional units of data. Each partial image data $D_i$ may be, for example, a set of a plurality of frames. It is assumed that according to the present embodiment, the partial image data have predetermined sequence numbers arranged in the order of frames.

Next, the key acquiring unit 430 is described below. The key acquiring unit 430 acquires key information K needed for verification data generation in the verification data generation unit 440, which will be described later, and outputs the key information K.

According to the present embodiment, the key information K acquired by the key acquiring unit 430 is assumed to be safely shared by the image distribution server 310 and the image reproduction client 340.

Next, the verification data generation unit 440 is described below. The partial image data $D_i$ output from the division unit 420 provided in the precedent stage and the key information K output from the key acquiring unit 430 are input to the verification data generation unit 440. The verification data generation unit 440 generates verification data $VD_0$ corresponding to the partial image data $D_i$ by utilizing the key information K. Then, the verification data generation unit 440 outputs the generated verification data $VD_0$.

The verification data generation process is performed only once and only on the first piece of the partial image data, which are obtained by the division unit 420. That is, according to the present embodiment, the verification data $VD_0$ is generated only on the first frame $D_0$.

According to the present embodiment, the verification data $VD_0$ is calculated as follows:

$$VD_0 = F(K, D_0) \quad \text{(equation 1)}$$

F(x, y) represents generation of verification data with respect to data y using a key x.

According to the present embodiment, an HMAC (Hash-based Message Authentication Code) is applied to the verification data generation F(x, y). The HMAC is known to those skilled in the art. Therefore, the detailed description of the HMAC is omitted herein. Although a method utilizing the HMAC is described as a method of performing verification data generation in the present embodiment, the method of performing verification data generation according to the present invention is not limited thereto. Various MAC generation algorithms, such as for example a CMAC (Cipher-based Message Authentication Code) generation algorithm, can be applied.

Next, the verification data holding unit 450 is described below. The verification data $VD_0$ generated by the verification data generation unit 440 provided in the precedent stage, or verification data $VD_i$ (or verification data $VD_i$ corresponding to current partial data $D_i$) generated in the hash value generation unit 460 (to be described later) is input to the verification data holding unit 450. The verification data holding unit 450 once holds the data input thereto. Then, the verification data holding unit 450 outputs the held hash value $VD_{i-1}$ (that is, the verification data $VD_{i-1}$ corresponding to the precedent partial data $D_{i-1}$) to the hash value generation unit 460.

That is, the verification data holding unit 450 serves as a temporary storage buffer adapted to once hold the hash value $VD_i$ generated in the hash value generation unit 460 (or the verification data $VD_0$ generated in the verification data generation unit 440) and to provide the held hash value $VD_i$ (or the verification data $VD_0$) to the hash value generation unit 460.

Next, the hash value generation unit 460 is described below. The partial image data $D_i$ obtained by the division in the division unit 420, which is provided in the precedent stage, and the verification data $VD_{i-1}$ held in the verification data holding unit 450 are input to the hash value generation unit 460. Then, the hash value generation unit 460 generates a hash value $VD_i$ according to the partial data $D_i$ and the verification data $D_{i-1}$. Subsequently, the hash value generation unit 460 outputs the generated hash value $VD_i$.

According to the present embodiment, the hash value $VD_i$ is calculated as follows.

$$VD_i = H(VD_{i-1} \| D_i) \quad \text{(equation 2)}$$

H( ) represents a hash function. Also, the expression "x∥y" represents a link of x and y.

In the present embodiment, a hash function for use in generation of a hash value is not limited thereto. Various hash functions, such as MD5 and SHA-1, can be employed.

Next, the output unit 470 is described below. The output unit 470 outputs the verification data $VD_i$ generated by the hash value generation unit 460 (alternatively, the verification data $VD_0$ generated in the verification data generation unit 440 provided in the preceding stage) and the partial data $D_i$ obtained by the division unit 420 by performing the division.

According to the present embodiment, the output unit 470 is adapted to output these data to the image reproduction client 340 (see FIG. 17) through the network 33 (see FIG. 17) using the NIC 210 (see FIG. 3). The output unit 470 according to the present embodiment is not limited thereto. In the output unit 470, the data to be output may be stored in, for example, the RAM 35, the HD 36, the CD 37, the FD 38, or the DVD 39.

The output unit 470 outputs the verification data $VD_i$ and the partial data $D_i$ so that the verification data $VD_i$ and the partial data $D_i$ can be associated with each other by the image reproduction client 340. An example of the form of output data in the present embodiment is described below with reference to FIG. 19. In the present embodiment, according to a form 510, the verification data $VD_i$ and the partial data $D_i$ are output by associating the verification data $VD_i$ with the partial data $D_i$. Alternatively, according to a form 520, the verification data $VD_i$ and the partial data $D_i$ are output by recording the verification data $VD_i$ in a header of the partial data $D_i$, as indicated by a shaded region.

Figure 20:
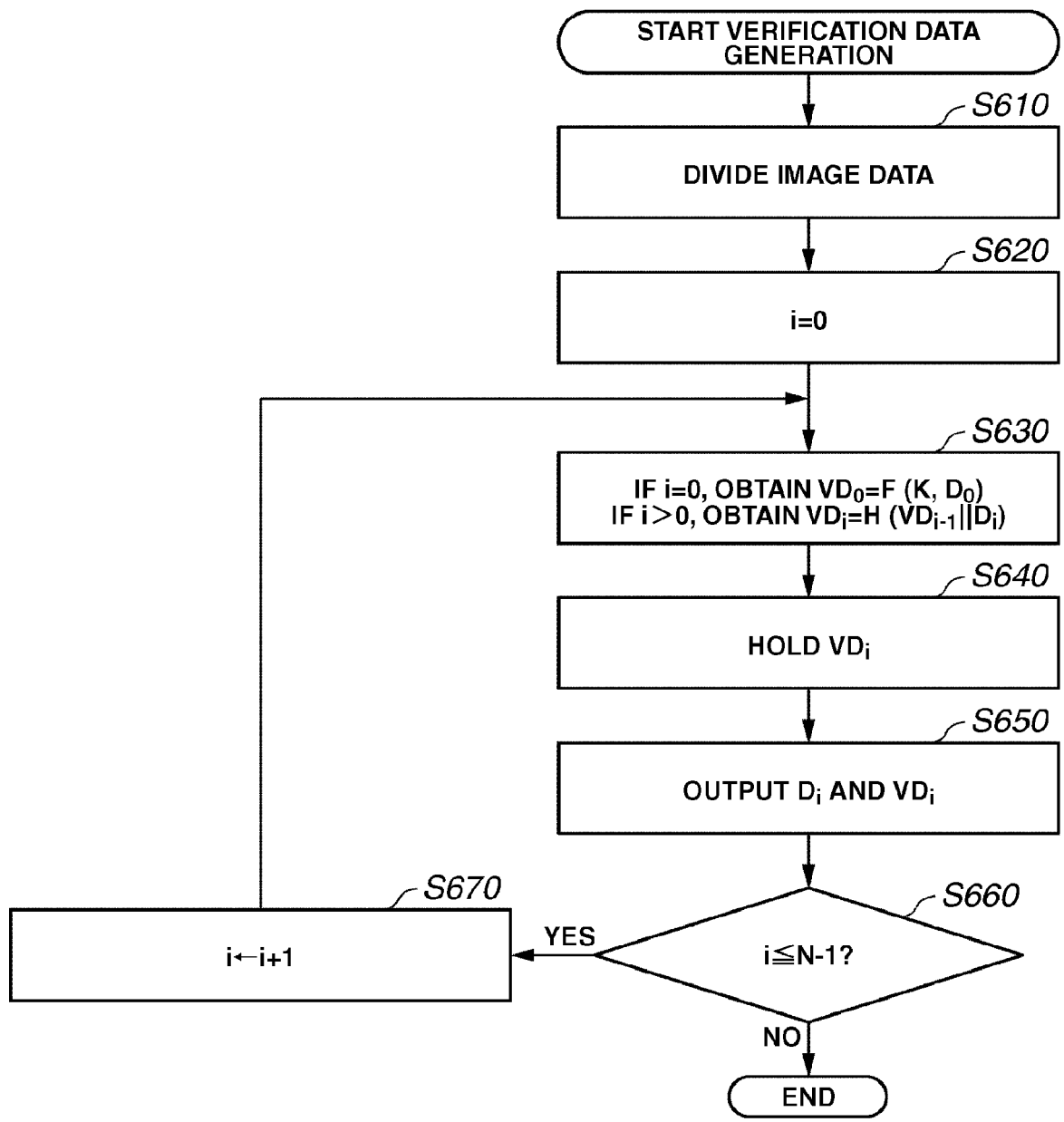
FIG. 20 is a flowchart showing the verification data generation process according to the second embodiment of the present invention.

Next, the above-described verification data generation process is described below with reference to FIG. 20. FIG. 20 is a flowchart showing the verification data generation process according to the present embodiment.

First, in step S610, the image data D input by the input unit 410 is divided by the division unit 420 shown in FIG. 18. Then, in step S620, a parameter i is initialized to 0. The parameter i is used to specify the partial data $D_i$.

Subsequently, in step S630, if i=0, the verification data $VD_i$ is calculated according to the equation 1 by the verification data generation unit 440. If i>0, the verification data $VD_i$ is calculated according to the equation 2 by the hash value generation unit 460. In step S640, the value of the (i−1)th verification data $VD_{i-1}$ needed for generating the i-th verification data $VD_i$, which is calculated in step S630, is held in the temporary storage buffer (that is, in the verification data holding unit 450).

In step S650, the partial data $D_i$ and the verification data $VD_i$ are output by the output unit 470 shown in FIG. 18. Subsequently, in step S660, it is determined whether the parameter i is equal to or less than (N−1). Incidentally, N is a total number of the partial data $D_i$ included in the image data D. If the parameter i is equal to or less than (N−1), the parameter i is increased by 1 in step S670. Then, the process returns to step S630. Otherwise, the verification data generation process is finished.

Verification Process and Method

Next, the verification process applicable to the present embodiment is described below with reference to FIG. 21.

Figure 21:
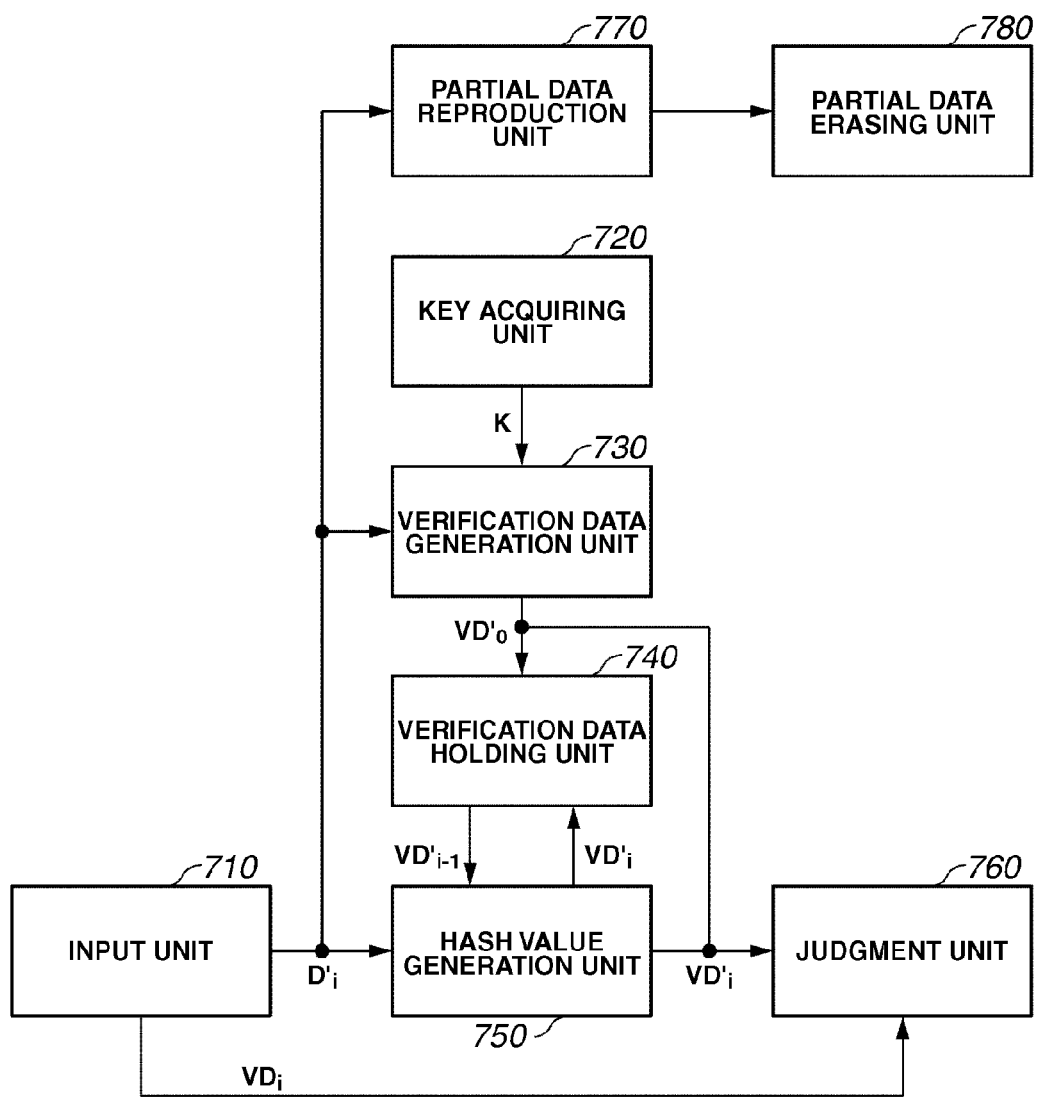
FIG. 21 is a block diagram showing units used to perform a verification process according to the second embodiment of the present invention.

FIG. 21 is a block diagram showing units used to perform a verification process according to the present embodiment. As shown in FIG. 21, the present embodiment includes an input unit 710, a key acquiring unit 720, a verification data generation unit 730, a verification data holding unit 740, a hash value generation unit 750, a judgment unit 760, a partial data reproduction unit 770, and a partial data erasing unit 780.

The verification function illustrated in FIG. 21 is mounted in the image reproduction client 340 (see FIG. 17).

First, the input unit 710 is described below. Partial data $D'_i$ and verification data $VD_i$ are input to the input unit 710. The partial data $D'_i$ and verification data $VD_i$ are the data output by the output unit 470 shown in FIG. 18. The symbol $D'_i$ differing from $D_i$ is used in view of the fact that the data $D_i$ output from the output unit 470 may be falsified on the network 330.

Next, the key acquiring unit 720 is described below. The key acquiring unit 720 acquires key information K needed for verification data generation in the verification data generation unit 730. Then, the key acquiring unit 720 outputs the acquired key information K.

The key information K acquired by the key acquiring unit 720 is the same as that acquired by the key acquiring unit 430 shown in FIG. 18.

Next, the verification data generation unit 730 is described below. The partial data $D'_i$ input by the input unit 710 and the key information K acquired by the key acquiring unit 720 are input to the verification data generation unit 730. Verification data $VD'_0$ is generated from the partial data $D'_i$ using the key information K by the verification data generation unit 730. Then, the generated verification data $VD'_0$ is output therefrom.

The verification data generation process performed by the verification data generation unit 730 is similar to the verification data generation process, which is performed by the verification data generation unit 440 using the equation 1.

Next, the verification data holding unit 740 is described below. The verification data $VD_0$ generated by the verification data generation unit 730 provided in the precedent stage or the verification data $VD_i$ generated by the hash value generation unit 750 that will be described later (that is, the verification data $VD_i$ corresponding to current partial data $D_i$) is input to the verification data holding unit 740. The verification data holding unit 740 holds the input data. Then, the hash value $VD_{i-1}$ held by the verification data holding unit 740 (that is, the verification data $Vd_{i-1}$ corresponding to the precedent partial data $D_{i-1}$) is output therefrom to the hash value generation unit 750.

Next, the hash value generation unit 750 is described below. The partial data $D_i$ input by the input unit 710 provided in the preceding stage and the verification data $VD_{i-1}$ held by the verification data holding unit 740 are input to the hash value generation unit 750. Then, the hash value generation unit 750 generates the hash value $VD_i$ according to the partial data $D_i$ and the verification data $VD_{i-1}$. The generated hash value $VD_i$ is output therefrom.

The hash value generation process performed in the hash value generation unit 750 is the same as the hash value generation process that is performed by the hash value generation unit 460 (FIG. 18) using the equation 2.

Next, the judgment unit 760 is described below. The judgment unit 760 compares the verification data $VD'_i$ output from the hash value generation unit 750 provided in the preceding stage with the verification data $VD_i$ output from the input unit 710. Then, the judgment unit 760 outputs a result of the verification.

In the present embodiment, if the value $VD_i$ is equal to the value $VD'_i$, it is determined that the partial data $D_i$ is correct (that is, the verification is successful). Conversely, if the value $VD_i$ differs from the value $VD'_i$, it is determined that the partial data $D'_i$ is incorrect (that is, the verification is unsuccessful).

In the present embodiment, a result of the judgment made by the judgment unit 760 is displayed on the screen of the monitor 22. If it is determined that the verification is unsuccessful, the partial data reproduction unit 770 that will be described later is caused to stop a partial data reproduction process and the subsequent partial data reproduction process. Consequently, the reproduction of the falsified image data (that is, the image data the verification of which is unsuccessful) can be prevented.

Next, the partial data reproduction unit 770 and the partial data erasing unit 780 are described below. The partial data $D'_i$ input by the input unit 710 is input to the partial data reproduction unit 770. Then, the partial data $D'_i$ is reproduced on the screen of the monitor 22. After the partial data $D'_i$ is reproduced by the partial data reproduction unit 770, the partial data $D'_i$ is immediately deleted by the partial data erasing unit 780 provided in the subsequent stage. That is, the partial data $D'_i$ is not held in the image reproduction client 340.

Figure 22:
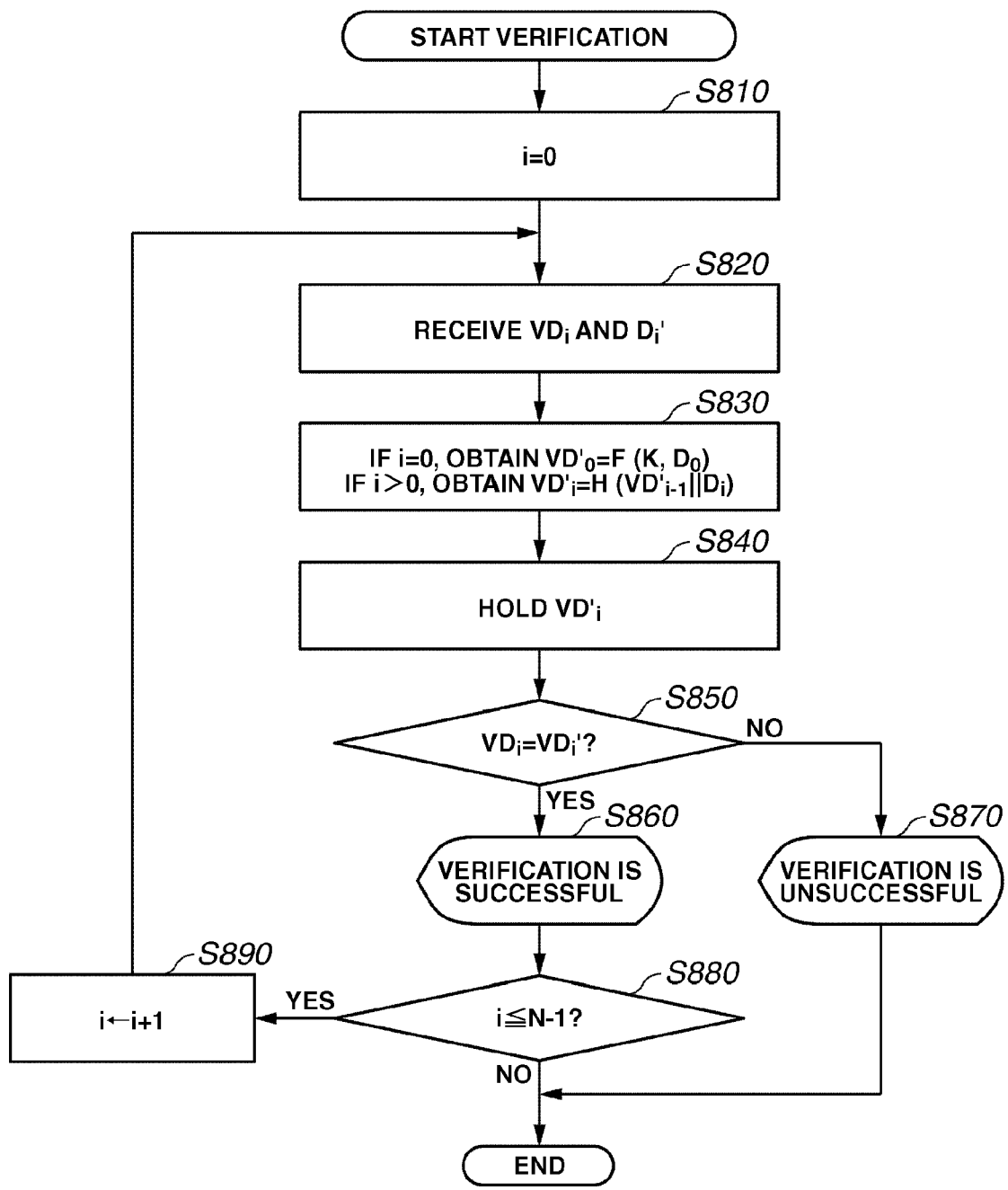
FIG. 22 is a flowchart showing the verification process according to the second embodiment of the present invention.

Next, the flow of the above-described verification process is described below with reference to FIG. 22. FIG. 22 is a flowchart showing the verification process according to the present embodiment.

First, in step S810, the parameter i is initialized.

The parameter i is used to specify the partial data $D_i$. Then, the verification data $VD_i$ and the partial data $D'_i$ are input to the input unit 710 shown in FIG. 21.

Subsequently, in step S830, if i=0, the verification data $VD_i$ is calculated according to the equation 1 by the verification data generation unit 730. If i>0, the verification data $VD_i$ is calculated according to the equation 2 by the hash value generation unit 750 shown in FIG. 21. In step S840, the value of the (i−1)th verification data $VD_{i-1}$ needed for generating the i-th verification data $VD_i$, which is calculated in step S830, is held in the temporary storage buffer (that is, in the verification data holding unit 740 shown in FIG. 21).

After the verification data $VD_i$ is generated, it is determined by the judgment unit 760 shown in FIG. 21 in step S850 whether the verification data $VD_i$ is matched with the verification data $VD'_i$. If matched, it is displayed in step S860 that the verification is successful. Then, the process proceeds to step S880. Otherwise, in step S870, it is displayed that the verification is unsuccessful. Then, the verification process is finished. Subsequently, the reproduction process by the image reproduction client 340 is stopped in synchronization with the failure of the verification. Also, the reception of new data from the image distribution server 310 is stopped.

Then, in step S880, it is determined whether the parameter i is equal to or less than (N−1). Incidentally, N is a total number of the partial data $D_i$ included in image data D. If the parameter i is equal to or less than (N−1), the parameter i is increased by 1 in step S890. Subsequently, the process returns to step S820. Otherwise, the verification data generation process is finished.

Example of Result of Verification

Hereinafter, the above-described verification data generation process and actual examples of the result of the verification process are described.

First, a result of the verification, which is performed in a case where a digital signature is generated corresponding to each of the partial data using a conventional method, is described below.

As shown in FIG. 23, data 231 includes partial data $D_i$ and digital signatures $VD_i$, which are generated by an image distribution server. In the example shown in FIG. 23, image data D is divided into five partial data $D_0$ to $D_4$. The digital signatures $VD_0$ to $VD_4$ respectively corresponding to the partial data $D_0$ to $D_4$ are generated. Under each set of the partial data and the digital signature, a method of generating a corresponding digital signature is indicated. As shown in FIG. 23, the digital signature corresponding to each of the partial data is generated by using a private key K and performing a digital signature generation F( ) on the associated partial data $D_0$, ..., or $D_4$.

Hereunder, examples 232 to 235 of the digital signatures $VD_i$ and the partial data $D'_i$, which are received by the client, are described in sequence.

The example 232 corresponds to a case where all of the partial data $D'_i$ and the digital signatures $VD_i$ transmitted from the server are not falsified at a middle part of the network and are distributed to the client. In this case, as illustrated in FIG. 23, the received partial data $D'_0$ to $D'_4$ are respectively matched with the partial data $D_0$ to $D_4$. Thus, in a case where the verification process is performed using the received partial data $D'_0$ to $D'_4$ and the digital signatures $VD_0$ to $VD_4$, the verification of each of all of the partial data is successful.

The example 233 corresponds to a case where, among the partial data $D_i$, the partial data $D'_0$, $D'_1$, $D'_3$, and $D'_4$ are distributed to the client without being falsified, and where the partial data $D^*_2$ is distributed while being falsified at a middle part of the network. In this case, when the verification process is performed by using the partial data $D'_0$, $D'_1$, $D'_3$, and $D'_4$ and the received digital signatures $VD_0$, $VD_1$, $VD_3$, and $VD_4$, the verification is successful. Conversely, because the partial data $D^*_2$ is falsified, in a case where the verification is performed using the received partial data $D^*_2$ and the received digital signature $VD_2$, the verification is determined to be unsuccessful.

The example 234 corresponds to a case where, among the partial data $D_i$, the partial data $D'_0$, $D'_2$, $D'_3$, and $D'_4$ are distributed to the client without being falsified, and where only the partial data $D'_1$ is not distributed. In this case, when the verification process is performed by using the partial data $D'_0$, $D'_2$, $D'_3$, and $D'_4$, which are not falsified, and the received digital signatures $VD_0$, $VD_2$, $VD_3$, and $VD_4$, the verification is successful. That is, although the partial data $D'_1$ is not received, no verification is performed on the partial data $D'_1$ according to this method. Thus, the verification is not determined to be unsuccessful.

The example 235 corresponds to a case where, among the partial data $D_i$, the partial data $D'_0$, $D'_1$, and $D'_4$ are distributed to the client without being falsified, and where the partial data $D'_3$ and $D'_2$ are distributed in an inverse order. In this case, when the verification process is performed by using the partial data $D'_0$, $D'_1$, and $D'_4$, which are not falsified, and the received digital signatures $VD_0$, $VD_1$, and $VD_4$, the verification is successful. Although the partial data $D'_3$ and $D'_2$ are distributed in an inverse order, when the verification is performed using the partial data $D'_3$ and $D'_2$ and the received digital signatures $VD_3$ and $VD_2$, the verification is determined to be successful.

Figure 24:
FIG. 24 shows examples of a result of the verification process according to the second embodiment of the present invention.

FIG. 24 is a diagram illustrating examples of a result of the verification process according to the present embodiment. As shown in FIG. 24, data 241 includes partial data $D_i$ and digital signatures $VD_i$, which are generated by the image distribution server 310. In the example shown in FIG. 24, image data D is divided into five partial data $D_0$ to $D_4$. The digital signatures $VD_0$ to $VD_4$ respectively corresponding to the partial data $D_0$ to $D_4$ are generated. Under each set of the partial data and the digital signature, a method of generating a corresponding digital signature is indicated. As shown in FIG. 24, the digital signature corresponding to each of the partial data is generated by performing a computation according to the equation 1 or the equation 2. In the case of the example 241, it is assumed that the data arranged from the left-side to the right-side are sequentially distributed from the image distribution server 310 to the image reproduction client 340.

Hereunder, examples 242 to 245 of the partial data $D'_i$ and the digital signatures $VD_i$, which are received by the image reproduction client 340, are described in sequence.

The example 242 corresponds to a case where all of the partial data $D'_i$ and the digital signatures $VD_i$ distributed from the image distribution server 310 are not falsified at a middle part of the network and are distributed to the image reproduction client 340. In this case, as illustrated in FIG. 24, the received partial data $D'_0$ to $D'_4$ are respectively matched with the partial data $D_0$ to $D_4$. Thus, in a case where the verification data $VD'_0$ to $VD'_4$ generated in the image reproduction client 340 using the received partial data $D'_0$ to $D'_4$ are matched with the received data $VD_0$ to $VD_4$, the verification of each of all of the partial data is successful.

The example 243 corresponds to a case where, among the partial data $D_i$ transmitted from the image distribution server 310, the partial data $D'_0$ and $D'_1$ are distributed to the image reproduction client 340 without being falsified, and where the partial data $D^*_2$ is distributed while being falsified at a middle part of the network. In this case, the digital signatures $VD'_0$ and $VD'_1$ generated from the partial data $D'_0$ and $D'_1$ are matched with the received digital signatures $VD_0$ and $VD_1$, so that the verification is successful. Conversely, because the partial data $D^*_2$ is falsified, the verification data $VD'_2$ generated from the partial data $D^*_2$ is not matched with the received verification data $VD_2$. Consequently, at the time of the verification using the partial data $D^*_2$, the verification is determined to be unsuccessful.

The example 244 corresponds to a case where, among the partial data $D_i$ transmitted from the image distribution server 310, the partial data $D'_0$, $D'_2$, $D'_3$, and $D'_4$ are distributed to the image reproduction client 340 without being falsified, and where only the partial data $D'_1$ is not distributed. In this case, when the verification data $VD'_0$ generated from the partial data $D'_0$, which is not falsified, is matched with the received verification data $VD_0$, the verification is successful. Conversely, because the partial data $D'_1$ is not received, the partial data distributed subsequently to the partial data $D'_0$ is the partial data $D'_2$. Thus, although the partial data $D'_2$ is not falsified, the associated verification data $VD'_2$ is generated from the precedent verification data $VD'_0$. Consequently, the value of the verification data $VD'_2$ generated in this manner differs from that of the received verification data $VD_2$. Thus, at the verification of the partial data $D'_2$, the verification can be determined to be unsuccessful. That is, according to the present embodiment, it can be determined that the partial data has been deleted at a middle point of the network. This cannot be determined by a conventional method.

The example 245 corresponds to a case where, among the partial data $D_i$ transmitted from the image distribution server 310, the partial data $D'_0$, $D'_1$, and $D'_4$ are distributed to the client without being falsified, and where the partial data $D'_3$ and $D'_2$ are distributed in an inverse order. In this case, the verification data $VD'_0$ and $VD'_1$ respectively generated from the partial data $D'_0$ and $D'_1$, which are not falsified, are matched with the received verification data $VD_0$ and $VD_1$, so that the verification is successful. However, although the partial data $D'_2$ should be distributed, the partial data $D'_3$ is distributed. Thus, the verification data $VD'_2$ generated from the received partial data $D'_3$ and the received precedent verification data $VD'_1$ differs from the received verification data $VD_2$. Consequently, at the time of the verification of the partial data $VD_2$, the verification can be determined to be unsuccessful. That is, it can be detected that an order, in which the partial data are distributed, has been falsified. This cannot be achieved according to a conventional method.

According to the present embodiment, even when the reception of all of the partial data (that is, the entire image data D) is not completed, whether received partial data $D_i$ is falsified can be verified at the timing at which the partial data $D_i$ is received. In addition to the falsification of the received partial data $D_i$, it can be determined whether the partial data $D_j$ to be distributed before the partial data $D_i$ is distributed is deleted (j<i), and whether the partial data $D_i$ are distributed in a correct order. Also, it is sufficient to perform the verification data generation process only on the first partial data $D_0$ at the verification data generation unit 440 shown in FIG. 18 in the image distribution server 310 and to perform only the hash value generation process on the remaining partial data $D_i$ (i>0) at the hash value generation unit 460 shown in FIG. 18. Thus, the verification data generation process can be performed at a high speed in the image distribution server 310. Similarly, it is sufficient to perform the verification data generation process only on the first partial data $D_0$ at the verification data generation unit 730 shown in FIG. 21 in the image reproduction client 340 and to perform only the hash value generation process on the remaining partial data $D_i$ (i>0) at the hash value generation unit 750 shown in FIG. 21. Thus, the verification data generation process can be performed at a high speed in the image reproduction client 340.

Hereinafter, modifications of the present embodiment are described below. The description of components of each of the modifications, which are similar to the corresponding components of the present embodiment, is omitted.

First Modification

Figure 19:
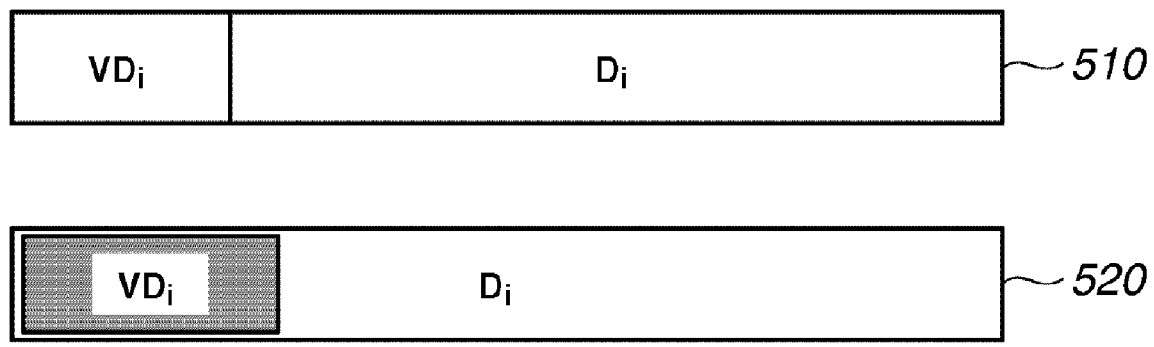
FIG. 19 shows structures of partial data and verification data according to the second embodiment of the present invention.

The present embodiment is adapted so that the verification data $VD_i$ respectively corresponding to the partial data $D_i$ are transmitted together with the partial data $D_i$, as illustrated in FIG. 19. However, the manner of transmitting the verification data according to the present embodiment is not limited thereto. It is sufficient to transmit, before the partial data $D_i$ is transmitted, at least the corresponding verification data $VD_i$ to the image reproduction client 340. Thus, the present embodiment may be modified so that, for example, all of the verification data $VD_i$ are preliminarily generated in the image distribution server 310, and that all of the generated verification data $VD_i$ are transmitted at a time before the first partial data $D_0$ is transmitted.

Second Modification

The present embodiment is adapted so that the verification is repeatedly performed until the verification of a total number N of the partial data $D_i$ included in the image data D is completed, as described in step S660 shown in FIG. 20 and in step S880 shown in FIG. 22. However, the manner of performing the verification process on the partial data according to the present embodiment is not limited thereto. The generation of verification data or the verification process can be finished at the time of the verification of optional partial data $D_n$ (n≦N). Consequently, the reproduction of image data can be finished at a desired time while a user reproduces the image data using the image reproduction client 340. In the present modification, even in this case, it can be verified whether the reproduced partial data is correct.

Third Modification

The present embodiment has described the example in which a MAC is used as the verification data. The verification data according to the present invention is not limited thereto. Various verification data can be employed. Hereunder, digital signature data can be employed as the verification data.

The verification data generation process in the case of employing the digital signature data as the verification data is similar to that illustrated in FIG. 18. Thus, the detailed description of the verification data generation process is omitted. The verification data generation process may be modified as follows. That is, in step S630 shown in FIG. 20, the digital signature corresponding to the partial data $D_0$ is generated using the private key K corresponding to the image distribution server 310 (that is, the digital signature generation process is employed as the verification data process $F(x, y)$). The steps other than step S630 of the process shown in FIG. 20 are similar to the case where the MAC is used. Thus, the description of the steps other than step S630 is omitted.

Figure 25:
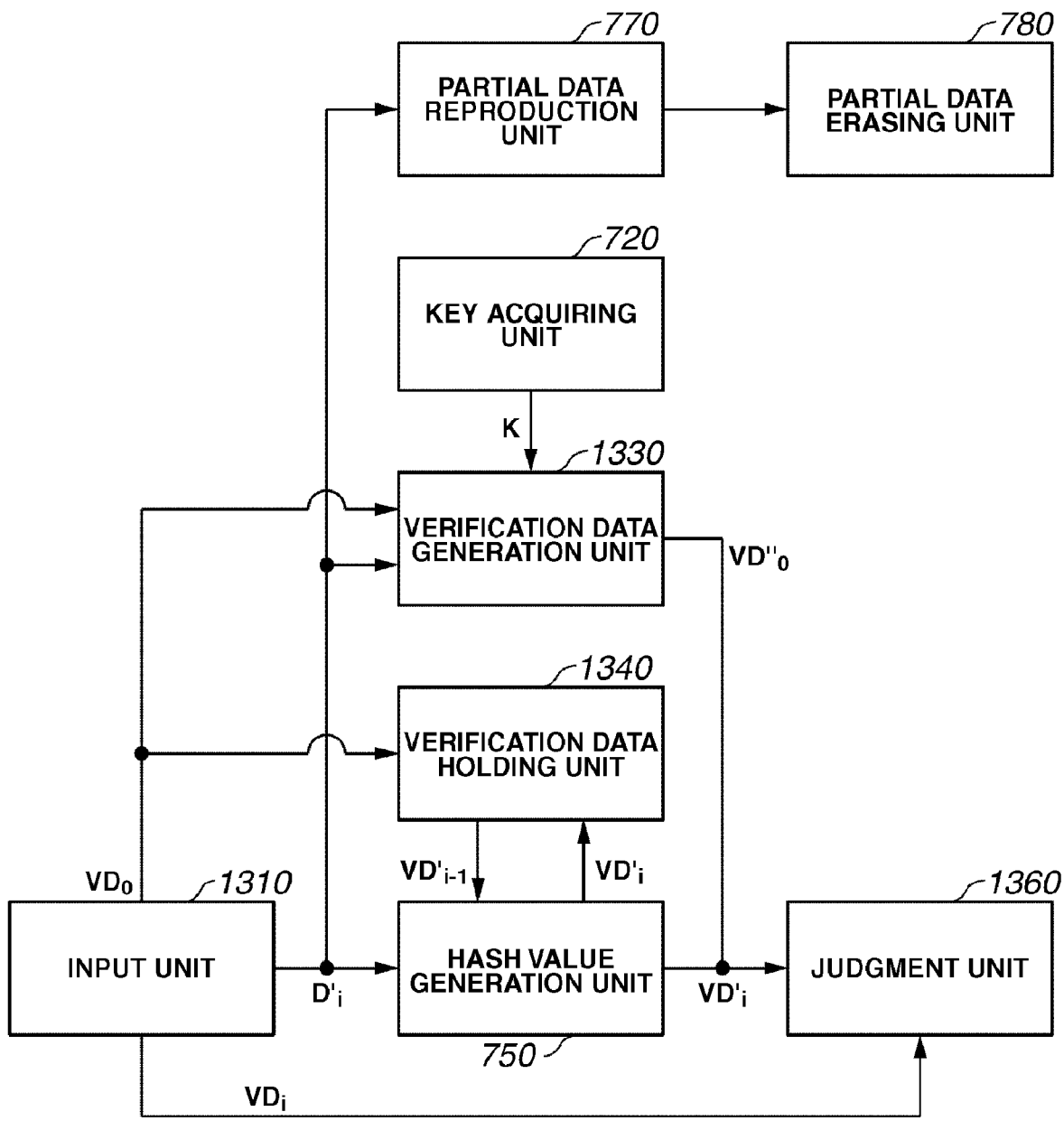
FIG. 25 is a block diagram showing units used to perform a verification process according to a modification of the second embodiment of the present invention.

Next, the verification process in the case of employing the digital signature data as the verification data is described below with reference to FIG. 25. FIG. 25 is a diagram showing units used to perform a verification process according to the present modification.

As illustrated in FIG. 25, the configuration of the units used in the case of employing the digital signature data as the verification data is similar to that of the units used in the case of employing the MAC as the verification data as shown in FIG. 21. Thus, the detailed description of the configuration of the units is omitted. In the case where the digital signature data is employed as the verification data, the relation among input/output data of an input unit 1310, a verification data generation unit 1330, a verification data holding unit 1340, and a judgment unit 1360 differs from that among input/output data in the case of employing the MAC as the verification data. Thus, the relation among the input/output data of the units shown in FIG. 25 is described below.

As shown in FIG. 25, the first verification data $VD_0$ output from the input unit 1310 is input to the verification data generation unit 1330 and the verification data holding unit 1340 (differing from the case shown in FIG. 21, the first verification data $VD_0$ is not input to the judgment unit 1360). Verification data VD" output from the verification data generation unit 1330 is input to the judgment unit 1360 (differing from the case shown in FIG. 21, this verification data is not input to the verification data holding unit 1340).

Figure 26:
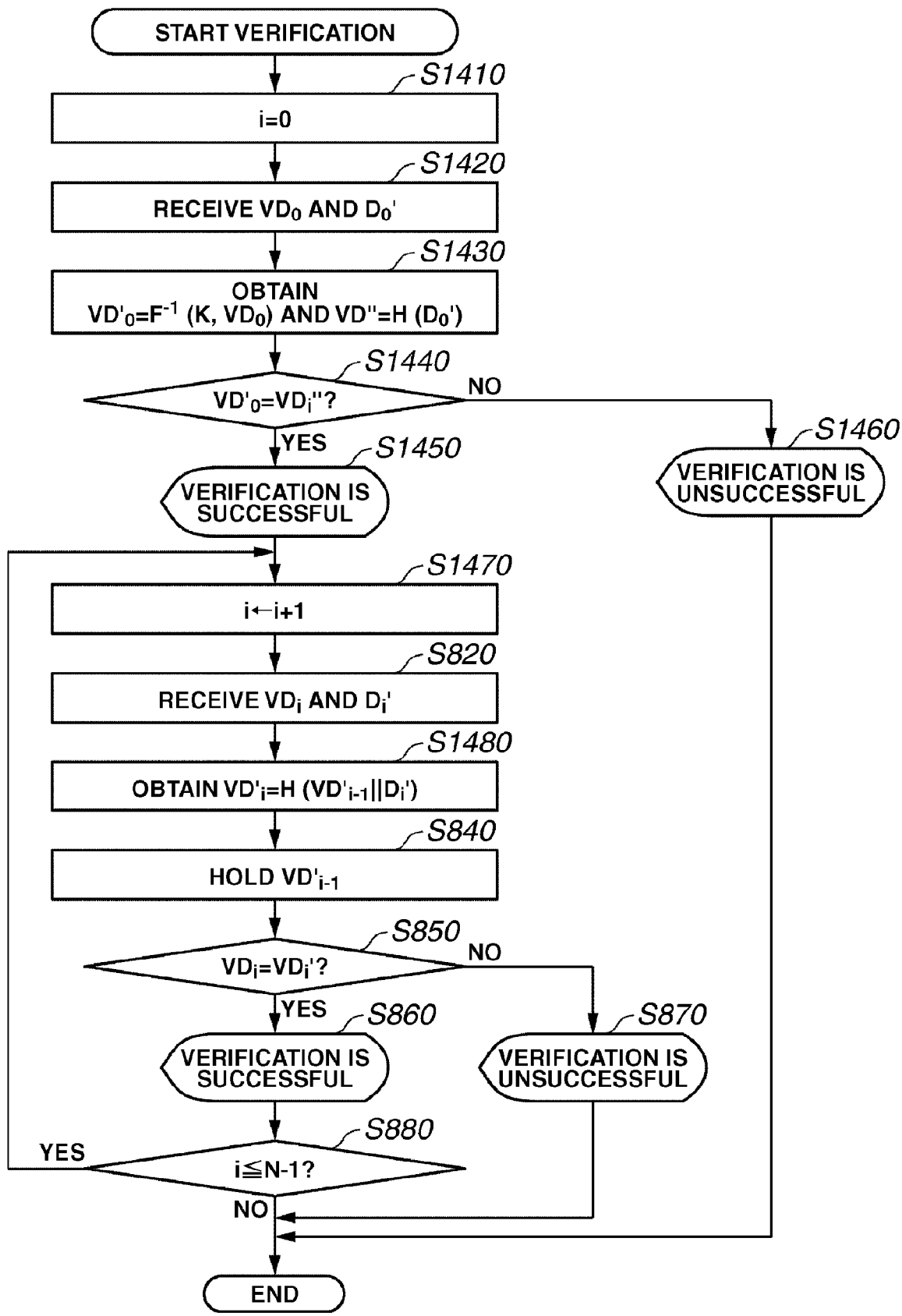
FIG. 26 is a flowchart showing the verification process according to the modification of the second embodiment of the present invention.

Next, the verification process in the case of employing the digital signature data as the verification data is described below with reference to FIG. 26. FIG. 26 is a flowchart showing the verification process according to the present modification. The description of the same steps as shown in FIG. 22 is omitted.

First, in step S1410, the parameter i is initialized. The parameter i is used to specify the partial data $D_i$. Then, in step S1420, the input unit 1310 shown in FIG. 25 receives the verification data $VD_0$ and the partial data $D'_0$.

Subsequently, in step S1430, the verification data generation unit 1330 shown in FIG. 25 decrypts the verification data $VD_0$ utilizing the public key K corresponding to the image distribution server 310 (that is, performing the process $F^{-1}(\ )$ as shown in FIG. 26). Also, in step S1430, the verification data generation unit 1330 performs a hash function on the partial data $D'_0$ to calculate a hash value $VD''_0$.

After step S1430, the judgment unit 1360 shown in FIG. 25 determines in step S1440 whether the data $VD'_0$ is matched with the data $VD''_0$. If it is found as a result of the judgment that the data $VD'_0$ is matched with the data $VD''_0$, it is displayed in step S1450 that the "verification is successful". Then, the process proceeds to step S1470. Otherwise, it is displayed in step S1460 that the "verification is unsuccessful". Then, the verification process is finished. Subsequently, the reproduction process by the image reproduction client 340 is stopped in synchronization with the failure of the verification. Also, the reception of new data from the image distribution server 310 is stopped.

Then, in step S1470, the parameter i is increased only by 1. In step S1480, the hash value generation unit 750 calculates the verification data $VD_i$ using the equation 2.

The digital signature generation process and the process of verification of the signature are known techniques. Thus, the detailed description of these processes is omitted. The algorithms for the digital signature process and the verification process according to the present invention are not limited to specific ones. Various digital signature generation algorithms, such as RSA and DSA, can be employed.

Third Embodiment

The second embodiment has described the example in which the image data D is sequentially distributed from the image distribution server 310 to the image reproduction client 340 from the leading partial data (that is, the data $D_0$) included in the image data D that is held in the image DB 320. However, the manner of distribution of the image data according to the present invention is not limited thereto. The image data D can be distributed from desired partial data included in the image data D (that is, a cue/play function can be performed). Thus, a third embodiment describes a case where the image data D is distributed from the desired partial data thereof.

The configuration of a system according to the present embodiment is similar to that described in the description of the second embodiment with reference to FIG. 17. Thus, the detailed description of the configuration of the system according to the third embodiment is omitted. Hereunder, the verification data generation process performed in the image distribution server 310 according to the present embodiment and the verification process performed in the image reproduction client 340 are described below.

First, the verification data generation unit applicable to the present embodiment is described below with reference to FIG. 27.

Figure 27:
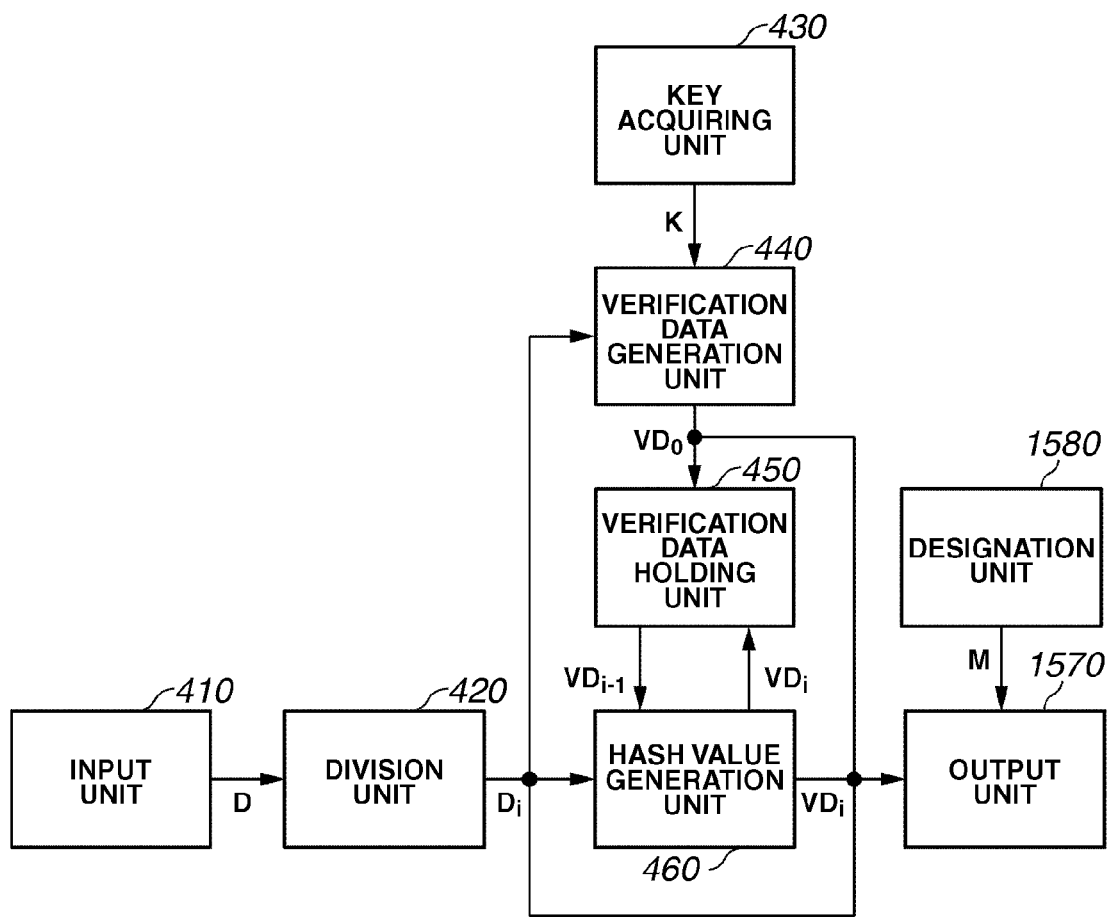
FIG. 27 is a block diagram showing units used to perform a verification data generation process according to a third embodiment of the present invention.

FIG. 27 is a diagram showing units used to perform a verification data generation function according to the present embodiment. The description of units shown in FIG. 27, which are similar to corresponding units of the second embodiment, is omitted. Thus, an output unit 1570 and a designation unit 1580 are described below.

First, the designation unit 1580 is described. The designation unit 1580 designates a parameter M indicating predetermined partial data and outputs the parameter M. The parameter M indicating desired partial data, which is designated by a user using the keyboard 214 or the mouse 213, is transmitted to the image distribution client 310.

Next, the output unit 1570 is described below. The partial data $D_i$, the verification data $VD_i$, and the parameter M are input to the output unit 1570. It is determined according to the parameter M whether the partial data $D_i$ and the verification data $VD_i$ are output. The partial data $D_i$ and the verification data $VD_i$ are output according to a result of the determination.

In the present embodiment, in a case where M=i, the output unit 1570 outputs the partial data $D_i$, the verification data $VD_i$, and the verification data $VD_{i-1}$ provided in the precedent stage. In a case where M≧i, the output unit 1570 outputs the partial data $D_i$ and the verification data $VD_i$. In a case where M<i, the output unit 1570 outputs no data.

Meanwhile, according to the present embodiment, the verification process performed in the image reproduction client 340 is similar to the verification process described in the second embodiment with reference to FIG. 21. Thus, the detailed description of the verification process is omitted.

Next, the verification data generation process and the verification process according to the present embodiment are described below.

Figure 28:
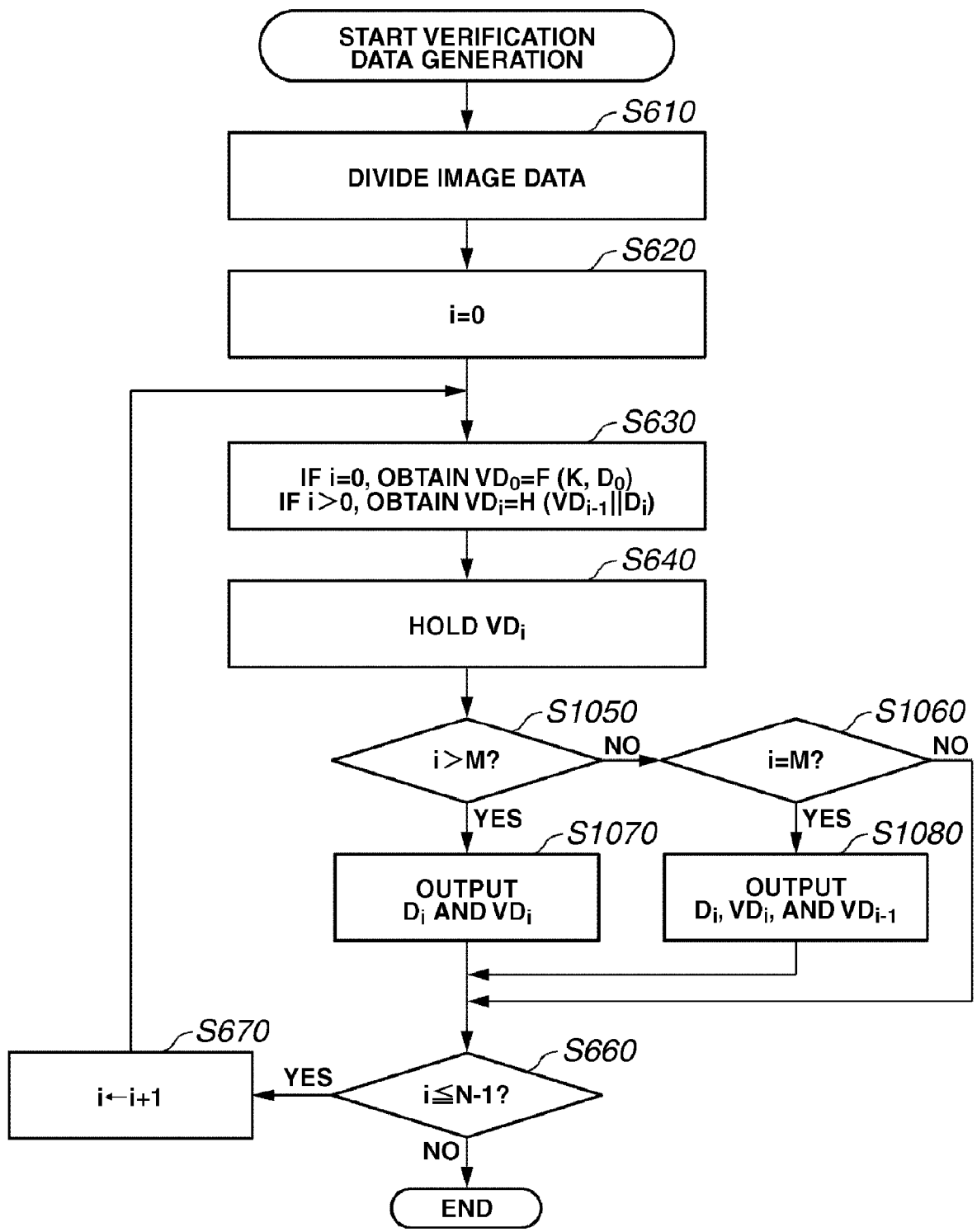
FIG. 28 is a flowchart showing the verification data generation process according to the third embodiment of the present invention.

First, the verification data generation process according to the present embodiment is described below with reference to FIG. 28. FIG. 28 is a flowchart showing the verification data generation process according to the present embodiment.

Steps shown in FIG. 28, which are similar to those of the process of the second embodiment, are omitted. Hereunder, steps S1050, S1060, S1070, and S1080 differ from the process performed in the second embodiment and are described below.

After the verification data $VD_i$ is generated in step S630, it is determined in step S1050 whether the parameter i is larger than the parameter M. The parameter M is a parameter specifying the first partial data DM of the image data D, which is designated by the image reproduction client 340. That is, the partial data subsequent to the partial data DM is sequentially distributed to the image reproduction client 340 from the image distribution server 310. If the parameter i is larger than the parameter M, the process proceeds to step S1070. In step S1070, the output unit 1570 shown in FIG. 27 outputs the partial data $D_i$ and the corresponding verification data $VD_i$. Otherwise, the process proceeds to step S1060.

Subsequently, in step S1060, it is determined whether the parameter i is equal to the parameter M. If the parameter i is equal to the parameter M, the process proceeds to step S1080. In step S1080, the output unit 1570 shown in FIG. 27 outputs the partial data $D_i$, the corresponding verification data $VD_i$, and the verification data $VD_{i-1}$ generated in the precedent stage. Otherwise, the process proceeds to step S660.

As described above, if the parameter i<the parameter M, the verification data $VD_i$ is generated but is not output. If the parameter i=the parameter M, the partial data $D_i$, the corresponding verification data $VD_i$, and the verification data $VD_{i-1}$ are output. Subsequently, if the parameter i>the parameter M, the partial data $D_i$ and the verification data $VD_i$ are output.

Figure 29:
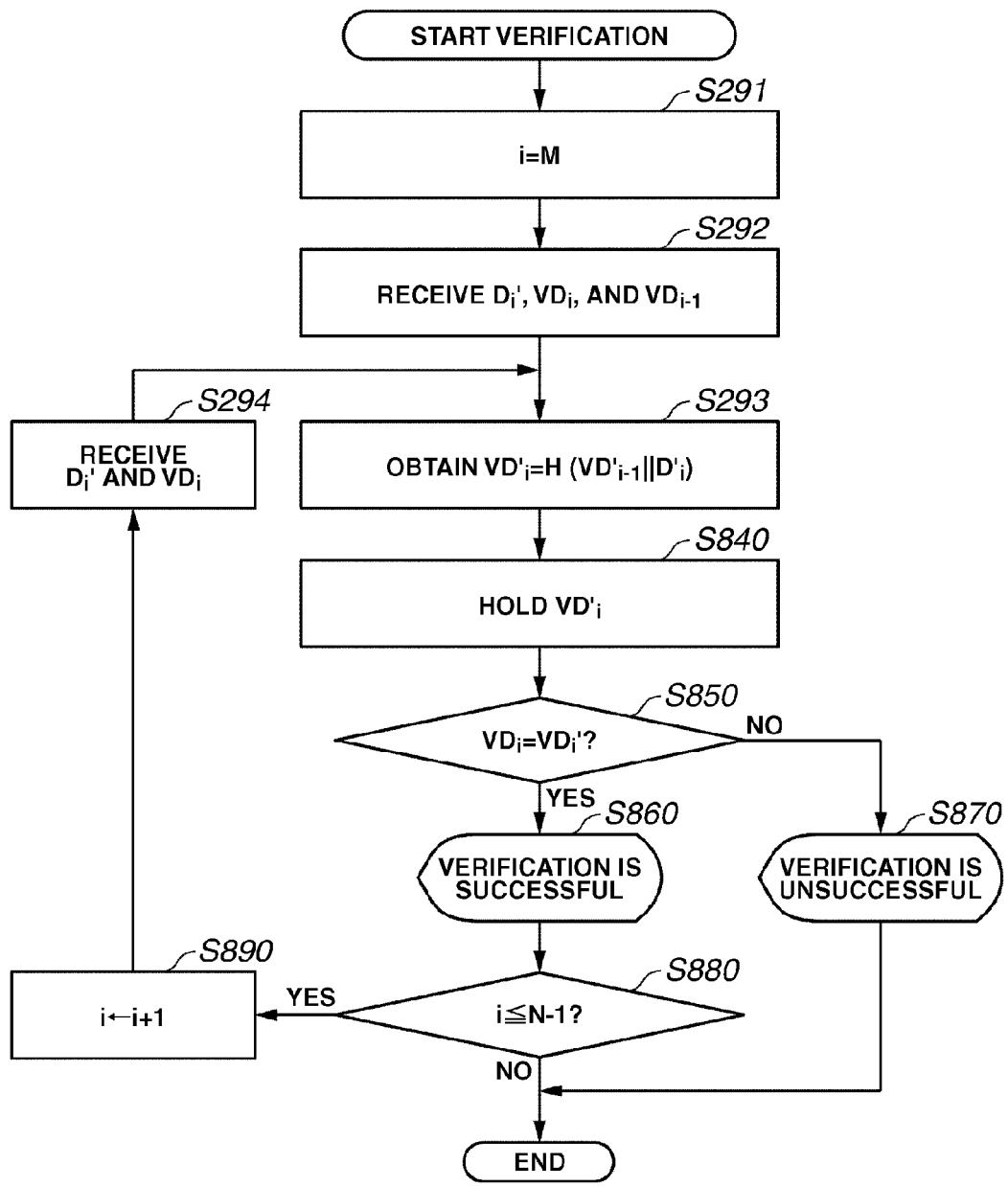
FIG. 29 is a flowchart showing the verification process according to the third embodiment of the present invention.

Next, the verification process according to the present embodiment is described below with reference to FIG. 29. FIG. 29 is a flowchart showing the verification process according to the present embodiment.

The description of steps shown in FIG. 29, which are similar to those of the process performed in the second embodiment, is omitted. Hereunder, steps S291, S292, S293, and S294, which differ from steps of the process performed in the second embodiment, are described below.

In step S291, the parameter i is initialized to the value of the parameter M. Subsequently, in step S292, the input unit 710 shown in FIG. 21 receives the partial data $D'_i$, the verification data $VD_i$, and $VD_{i-1}$. In step S293, the hash value generation unit 750 calculates the verification data $VD'_i$ using the equation 2.

On the other hand, in step S294, the input unit 710 shown in FIG. 21 receives the partial data $D'_i$ and the verification data $VD_i$ distributed from the image distribution server 310.

As described above, in the present embodiment, the partial data $D_i$ subsequent to the partial data DM is distributed from the image distribution server 310 to the image reproduction client 340. The image reproduction client 340 performs the verification process on the partial data subsequent to the partial data DM. In step S293, only in a case where the parameter i=the parameter M, the partial data $D'_i$, and the verification data $VD_i$ and $VD_{i-1}$ are received to generate associated verification data $VD'_i$. Conversely, in a case where the parameter i>the parameter M, similarly to the second embodiment, only the partial data $D'_i$ and the verification data $VD_i$ are received in step S294.

Practical examples of the verification data generation process and the verification process are described below.

FIG. 30 is a diagram showing results of the verification data generation process and the verification process according to the present embodiment.

FIG. 30 shows sets 3001 of partial data $D_i$ and verification data $VD_i$ generated in the image distribution server 310. In the example shown in FIG. 30, the image data D is divided into five partial data $D_0$ to $D_4$. Verification data $VD_0$ to $VD_4$ respectively corresponding to the partial data $D_0$ to $D_4$ are generated. In FIG. 30, under each set of the partial data and the verification data, a method of generating corresponding verification data, that is, a computation method using the equation 1 or the equation 2 is indicated. Also, it is assumed that the partial data $D_i$ subsequent to the partial data $D_2$ is distributed from the image distribution server 310 to the image reproduction client 340.

As illustrated in FIG. 30, the partial data $D_0$ and $D_1$ are not distributed to the image reproduction client 340 (as indicated by dashed lines). Although the associated verification data $VD_0$ and $VD_1$ are generated but are not transmitted.

Meanwhile, when the partial data $D_2$ (the first one of the partial data requested by the image reproduction client 340) is distributed, the verification data $VD_1$ generated in the precedent stage is transmitted in addition to the verification data $VD_2$. Then, the image reproduction client 340 generates verification data $VD'_2$ from the received partial data $D'_2$ and the verification data $VD_1$. Subsequently, the image reproduction client 340 compares the verification data $VD'_2$ with the received verification data $VD_2$. Thus, it can be verified whether the received partial data $D'_2$ is correct.

When the partial data $D_3$ and $D_4$ are distributed, the verification data $VD_3$ and $VD_4$ respectively corresponding to the partial data $D_3$ and $D_4$ are distributed. Thus, the image reproduction client 340 can verify whether the received partial data $D'_3$ and $D'_4$ are correct.

As described above, according to the present embodiment, even when the image data D is distributed from a middle part thereof, it can be verified whether the distributed partial data is falsified, and whether the order, in which the distributed partial data are arranged, is falsified.

According to the first to third embodiments, even when all of the signed data are not received, the validity of the received signed data can be verified using the partial signed data received.

Other Embodiments

Although the above-described embodiments include hardware or the like constituting a network, each processing unit can actually be implemented by software. That is, the present invention can also be achieved by supplying a storage medium (or recording medium), in which software program code that realizes the functions of the above-described embodiments is stored, to a system or apparatus and by then causing a computer (or CPU or MPU) of the system or the apparatus to read and execute the program code stored in the storage medium. In this case, the program code itself read from the storage medium achieves the functions of the above-described embodiments. The storage medium, in which the program code is recorded, is also encompassed by the present invention. In an example, the present invention can be achieved by a non-transitory computer-readable storage medium which stores a program that when loaded into a computer and executed causes the computer to perform an information processing method of the above-described embodiments.

The case of achieving the present invention is not limited to the case of achieving the functions of the above-described embodiments by executing the program code, which is read by the computer, but includes a case where an operating system (OS) or the like, which is running on the computer, performs part or all of actual processing according to an instruction by the program code to thereby achieve the functions of the above-described embodiments. This case is also covered by the present invention.

Also, the case of achieving the present invention includes a case where the functions of the above-described embodiments are achieved after the program code read from the storage medium is stored in a memory provided in a function expansion board inserted into the computer or a function expansion unit connected to the computer. That is, the case of achieving the present invention also includes a case where a CPU or the like provided in the function expansion board or unit performs part or all of the actual processing according to an instruction from the program code to thereby achieve the functions of the above-described embodiments. This case is also covered by the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-214529 filed Jul. 25, 2005, and No.

2005-260884 filed Sep. 8, 2005, which are hereby incorporated by reference herein in their entirety.

What is claimed is:

1. An information processing apparatus, comprising:
    an input unit adapted to input, as $i^{th}$ frame data, moving image data composed of n number of frame data arranged in an order of frames, wherein i is an integer between 1 and n;
    an acquiring unit adapted to acquire key data for use in generating first verification data;
    a holding unit adapted to hold generated first verification data;
    a first generation unit adapted to generate first verification data corresponding to each frame, wherein when i=1, the first generation unit generates first verification data corresponding to the $i^{th}$ frame based on the $i^{th}$ frame data and the acquired key data, and when i>2, the first generation unit generates first verification data corresponding to the $i^{th}$ frame based on the $i^{th}$ frame data and first verification data corresponding to an $(i-1)^{th}$ frame held in the holding unit, and wherein the first generation unit generates the first verification data in an order of frames from a $1^{st}$ frame; and
    a transmission unit adapted to transmit, with respect to each frame, the input $i^{th}$ frame data and the generated first verification data corresponding to the $i^{th}$ frame, wherein the transmission unit concatenates the $i^{th}$ input frame data and the generated first verification data corresponding to the $i^{th}$ frame as concatenated data and transmits the concatenated data, in the order of frames from the 1st frame.

2. A verification processing apparatus adapted to verify the first verification data generated by the information processing apparatus according to claim 1, the verification processing apparatus comprising:
    a second information processing apparatus comprising:
        a receiving unit adapted to receive $i^{th}$ frame data and the first verification data corresponding to the $i^{th}$ frame, wherein the reception is performed with respect to each frame in the order of frames,
        a second acquiring unit adapted to acquire second key data for use in generating second verification data;
        a second holding unit adapted to hold generated second verification data;
        a second generation unit adapted to generate second verification data corresponding to each frame, wherein when i=1, the second generation unit generates second verification data corresponding to the $i^{th}$ frame based on the received $i^{th}$ frame data and the acquired second key data, and when i>2, the second generation unit generates second verification data corresponding to the $i^{th}$ frame based on the received $i^{th}$ frame data and second verification data corresponding to the $(i-1)^{th}$ frame held in the second holding unit
        a verification unit adapted to verify the received $i^{th}$ frame data using the second verification data generated by the second generation unit and the first verification data received by the receiving unit, and
        a control unit adapted to control the receiving unit according to a result of verification performed by the verification unit.

3. An information processing method, comprising:
    inputting, as $i^{th}$ frame data, moving image data composed of n number of frame data arranged in an order of frames, wherein i is an integer between 1 and n;
    acquiring key data for use in generating first verification data;
    holding generated first verification data;
    generating first verification data corresponding to each frame, wherein when i=1, generating includes generating first verification data corresponding to the $i^{th}$ frame based on the $i^{th}$ frame data and the acquired key data, and when i>2, generating includes generating first verification data corresponding to the $i^{th}$ frame based on the $i^{th}$ frame data and first verification data corresponding to a held $(i-1)^{th}$ frame, and wherein generating includes generating the first verification data in an order of frames from a $1^{St}$ frame; and
    transmitting, with respect to each frame, the input $i^{th}$ frame data and the generated first verification data corresponding to the $i^{th}$ frame, wherein transmitting includes concatenating the $i^{th}$ input frame data and the generated first verification data corresponding to the $i^{th}$ frame as concatenated data and transmitting the concatenated data, in the order of frames from the 1st frame.

4. A verification processing method for verifying the first verification data generated by the information processing method according to claim 3, the verification processing method comprising:
    receiving $i^{th}$ frame data and the first verification data corresponding to the $i^{th}$ frame, wherein the reception is performed with respect to each frame in the order of frames;
    acquiring second key data for use in generating second verification data;
    holding generated second verification data;
    generating second verification data corresponding to each frame, wherein when i=1, generating includes generating second verification data corresponding to the $i^{th}$ frame based on the received $i^{th}$ frame data and the second acquired key data, and when i>2, generating includes generating second verification data corresponding to the $i^{th}$ frame based on the received $i^{th}$ frame data and second verification data corresponding to the held $(i-1)^{th}$ frame;
    verifying the received $i^{th}$ frame data using the generated second verification data and the received first verification data; and
    controlling the receiving according to a result of verifying the received $i^{th}$ frame.

5. A non-transitory computer-readable storage medium which stores a program that when loaded into a computer and executed causes the computer to perform an information processing method according to claim 3.

* * * * *